(12) United States Patent
Korepanov et al.

(10) Patent No.: US 11,269,816 B2
(45) Date of Patent: Mar. 8, 2022

(54) RECENT FILE SYNCHRONIZATION AND AGGREGATION METHODS AND SYSTEMS

(71) Applicant: PARALLELS INTERNATIONAL GMBH, Schaffhausen (CH)

(72) Inventors: Evgeniy Korepanov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 167 days.

(21) Appl. No.: 16/363,039

(22) Filed: Mar. 25, 2019

(65) Prior Publication Data

US 2020/0311028 A1 Oct. 1, 2020

(51) Int. Cl.
*G06F 16/178* (2019.01)
*G06F 16/182* (2019.01)

(52) U.S. Cl.
CPC .......... *G06F 16/178* (2019.01); *G06F 16/183* (2019.01)

(58) Field of Classification Search
CPC ...... G06F 16/178; G06F 16/183; G06F 16/27; G06F 16/273; G06F 16/13
USPC ........................................................ 707/626
See application file for complete search history.

(56) References Cited

U.S. PATENT DOCUMENTS

| 8,332,357 | B1 * | 12/2012 | Chung | G06F 16/27 707/634 |
| 9,479,567 | B1 * | 10/2016 | Koorapati | G06F 16/27 |
| 2009/0144343 | A1 * | 6/2009 | Holt | G06F 16/273 |
| 2011/0137991 | A1 * | 6/2011 | Russell | G06Q 10/06 709/204 |
| 2011/0289498 | A1 * | 11/2011 | Xie | G06F 8/61 717/171 |
| 2014/0040979 | A1 * | 2/2014 | Barton | G06F 21/604 726/1 |
| 2014/0201137 | A1 * | 7/2014 | Vibhor | G06F 16/275 707/610 |
| 2014/0379647 | A1 * | 12/2014 | Smith | G06F 16/178 707/624 |
| 2015/0169616 | A1 * | 6/2015 | Benraz | G06F 11/3419 714/798 |
| 2015/0347447 | A1 * | 12/2015 | Ho | G06F 16/178 707/622 |
| 2016/0212501 | A1 * | 7/2016 | Master | H04N 21/23614 |
| 2016/0277374 | A1 * | 9/2016 | Reid | H04L 63/101 |
| 2016/0321293 | A1 * | 11/2016 | Auer | G06F 16/2228 |
| 2017/0177194 | A1 * | 6/2017 | Lyons | G06F 16/9558 |
| 2017/0177613 | A1 * | 6/2017 | Sharma | G06F 21/45 |
| 2017/0329677 | A1 * | 11/2017 | Crofton | G06F 16/2455 |

(Continued)

*Primary Examiner* — Syed H Hasan
*Assistant Examiner* — Nicholas E Allen
(74) *Attorney, Agent, or Firm* — Rosenberg, Klein & Lee

(57) ABSTRACT

With multiple software applications, multiple electronic devices for a user to access and work upon, and multiple potential storage locations for the files it is difficult for a user to remember the identity of a file worked upon, its storage location, or which application they employed. Whilst some applications provide a user with a listing of recently opened files these are only those accessed by that specific application upon a specific device. Embodiments of the invention provide users with a synthesized centralized view of all files accessed irrespective of where the user has stored the electronic content, with which electronic device the electronic content was accessed with, or with which software application the electronic content was accessed with.

21 Claims, 13 Drawing Sheets

(56) References Cited

U.S. PATENT DOCUMENTS

| | | | | |
|---|---|---|---|---|
| 2017/0331892 A1* | 11/2017 | Crofton | ............... | H04L 67/1097 |
| 2018/0157833 A1* | 6/2018 | Chelarescu | ........... | G06F 21/554 |
| 2018/0349408 A1* | 12/2018 | Jewell | ................. | G06F 16/1734 |
| 2018/0373714 A1* | 12/2018 | Elvheim | ................. | G06Q 10/06 |
| 2019/0051210 A1* | 2/2019 | Bookspan | ............. | G06F 16/284 |
| 2020/0311028 A1* | 10/2020 | Korepanov | ........... | G06F 16/178 |

* cited by examiner

RECENT FILE SYNCHRONIZATION AND AGGREGATION METHODS AND SYSTEMS

FIELD OF THE INVENTION

This patent application relates to file management within software applications and more particularly to providing users with visibility of recently accessed files across both local file systems and remote file systems wherein the files are created/saved/edited using either local software applications and/or remotely hosted software applications.

BACKGROUND OF THE INVENTION

Software applications are an integral part of a wide range of electronic systems, electronic devices, etc. which allow a user or users to perform one or more activities with respect to the electronic systems, electronic devices etc. Such applications can allow a user to generate, edit, and process electronic content which may represent text, numbers, audio, graphics, or a combination of these elements as well as other forms of electronic content. Some software applications focus on a single task, such as word processing, whilst others commonly referred to as integrated software can include several applications allowing the user to perform multiple tasks. This electronic content is stored within a file within a file system in electronic memory of either a device the user is accessing the software application upon, a portable memory such as a USB stick, or a memory forming part of a remote system or server. Increasingly, with cloud based services the physical location of the memory storing the file is unknown to the user and all they have is virtual information as to its location with the file system.

With multiple software applications, multiple electronic devices for a user to access and work upon, and multiple potential storage locations for the files it is increasingly difficult for users remember the identity of the file they worked upon, where it is stored or even which application they generated, edited or processed the electronic content with. Some applications provide a user with a listing of recently opened files, but these are only those the user has worked upon within that application but do not include those files remotely generated, edited, etc. by the user upon remote systems.

Accordingly, it would be beneficial to provide a user with a centralized view of all the recent files that they have accessed irrespective of whether the user generates, amends, or processes the electronic content accessed upon one or more local devices or upon one or more remote systems.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to file management within software applications and more particularly to providing users with visibility of recently accessed files across both local file systems and remote file systems wherein the files are created/saved/edited using either local software applications and/or remotely hosted software applications.

In accordance with an embodiment of the invention there is provided a method of providing upon a first electronic device within a first memory a first electronic registry accessible to a first microprocessor forming part of the first electronic device, the first electronic registry comprising:
  a first portion relating to remote files established in dependence upon first events received from one or more second electronic devices for which associated first metadata is stored within the first electronic registry, each first event relating to a remote file stored upon a second memory accessible to the second electronic device of the one or more second electronic devices;
  a second portion relating to local files established in dependence upon second events associated with the first electronic device for which associated second metadata is stored within the first electronic registry, each second event relating to a local file stored upon a third memory accessible to the first electronic device.

In accordance with an embodiment of the invention there is provided a system comprising:
  a local client device comprising a first microprocessor, a first memory storing first computer executable instructions, a first network interface connecting the local client device to a communications network and one or more user interfaces for receiving user inputs, the first computer executable instructions when executed by the first microprocessor configure the local client device to:
    receive first inputs from the user, the first inputs relating to a request to access a remote application upon a remote server also connected to the communications network;
    transmit first data to the remote server to establish a first session upon the remote server providing access to the remote application for the user;
    receive second inputs from the user, the second inputs relating to a first action relating to a file to be performed by the remote application;
    transmit second data to the remote server to establish the action;
    receive third data from the remote server, the third data comprising metadata relating to the file stored within a second memory;
    generate with a client application a file Content Resource Locator (CRL); and
    store an entry within a first listing of files comprising the at least the file CRL; and
  the remote server comprising a second microprocessor, a third memory storing second computer executable instructions, a second network interface connecting the remote server to the communications network, the second computer executable instructions when executed by the second microprocessor configure the remote server to:
    receive the first data from the local client device;
    establish the remote application in execution upon the remote server;
    establish the first session upon the remote server to provide access to the remote application to the user;
    receive the second data from the local client device;
    perform the first action relating to the file with the remote application;
    storing the file within at least one of the second memory and a storage system accessible to the remote server;
    generate the third data relating to the storage of the file within at least one of the second memory and the storage system accessible to the remote server;
    store an entry within a second listing of files comprising at least a predetermined portion of the third data; and
    transmit the third data to the local client device.

In accordance with an embodiment of the invention there is provided a local client device comprising:
a first microprocessor;
a first memory storing first computer executable instructions;
a first network interface connecting the local client device to a communications network; and
one or more user interfaces for receiving user inputs from a user of the local client device; wherein
the first computer executable instructions when executed by the first microprocessor configure the local client device to:
  receive first inputs from the user, the first inputs relating to a request to access a remote application upon a remote server also connected to the communications network;
  transmit the first data to the remote server to establish a first session upon the remote server providing access to the remote application for the user;
  receive second inputs from the user, the second inputs relating to an action to be performed by the remote application which results in the storing of a file within at least one of a second memory and a storage system accessible to the remote server;
  transmit the second data to the remote server to establish the action;
  receive third data from the remote server, the third data comprising metadata relating to the file stored within the at least one of the second memory and the storage system;
  generate with a client application a file Content Resource Locator (CRL); and
  store an entry within a first listing of files comprising the at least the file CRL.

In accordance with an embodiment of the invention there is provided a remote server comprising:
a first microprocessor;
a first memory storing first computer executable instructions;
a first network interface connecting the remote server to a communications network; wherein
the first computer executable instructions when executed by the first microprocessor configuring the remote server to:
  receive first data from a local client device relating to a request established by a user of the local client device to access a remote application upon a remote server also connected to the communications network;
  establish the remote application in execution upon the remote server;
  establish the first session upon the remote server to provide access to the remote application to the user;
  receive second data from the local client device relating to an action to be performed by the remote application which results in the storing of a file within at least one of the first memory forming part of the remote server and a storage system accessible to the remote server;
  perform the action with the remote application;
  generate third data relating to the storage of the file within the first memory;
  store an entry within a first listing of files comprising at least a predetermined portion of the third data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
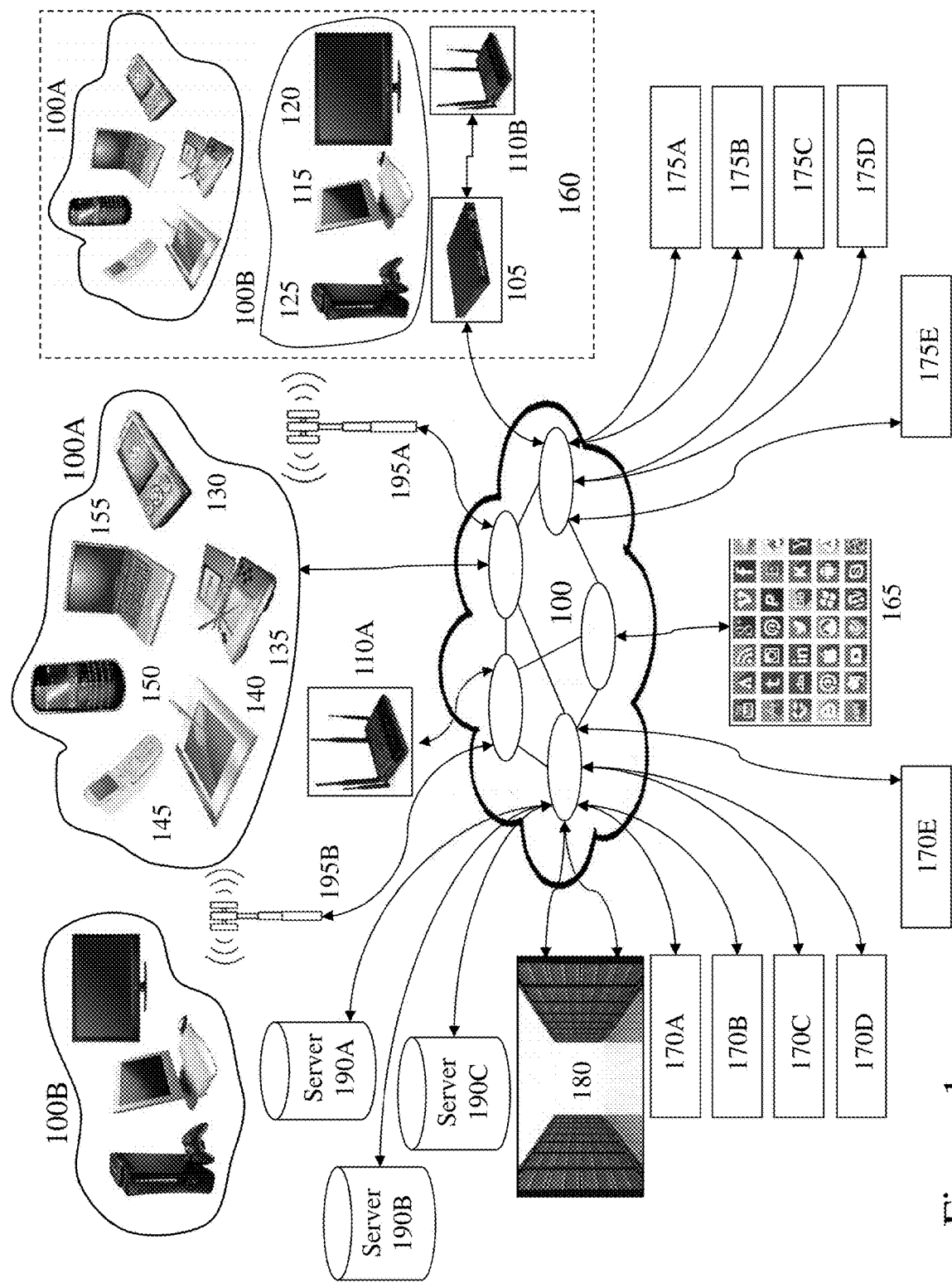
FIG. 1 depicts a network environment supporting embodiments of the invention.
Figure 2:
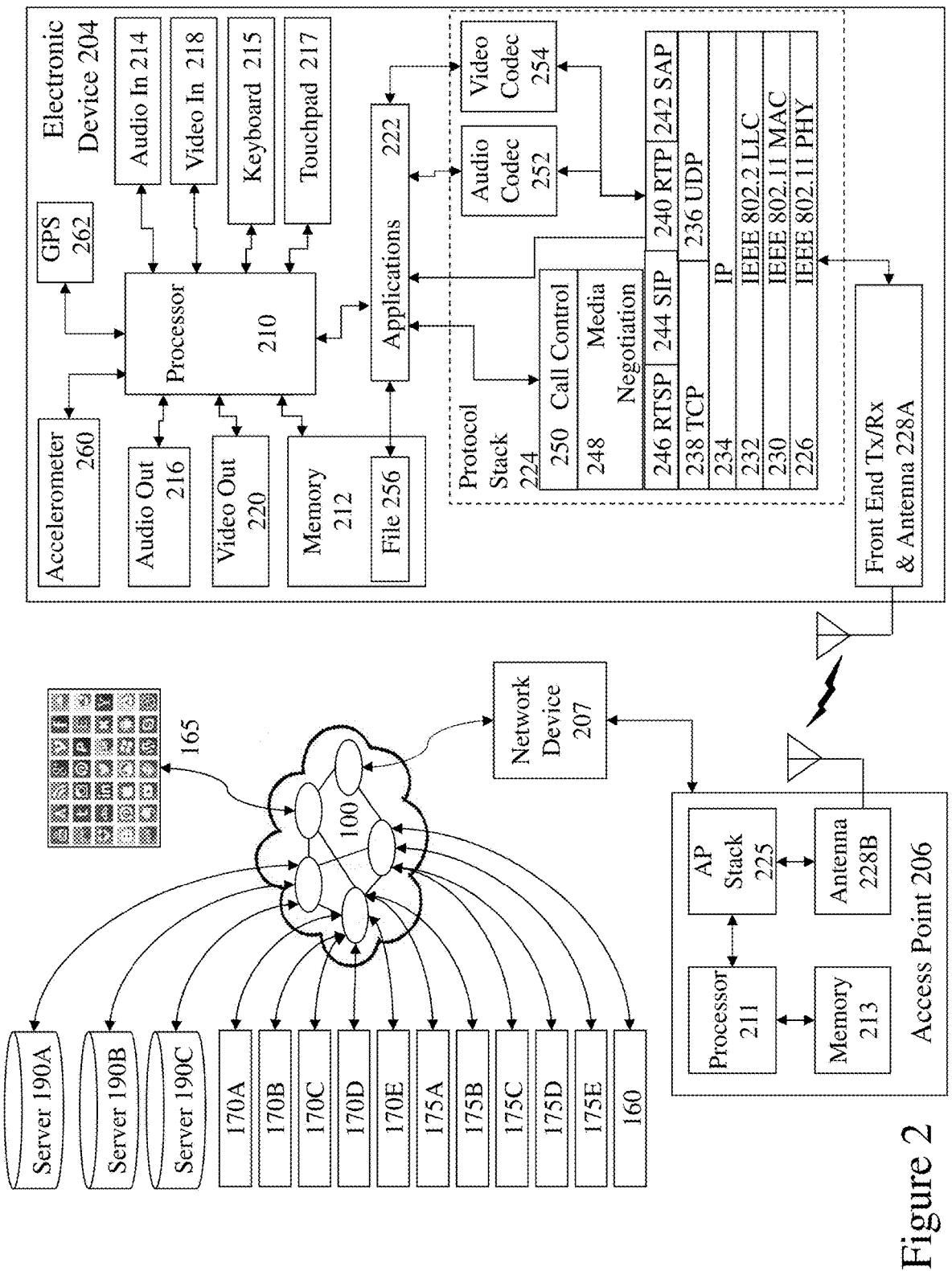
FIG. 2 depicts an electronic device supporting embodiments of the invention.

The present description is directed to file management within software applications and more particularly to providing users with visibility of recently accessed files across both local file systems and remote file systems wherein the files are created/saved/edited using either local software applications and/or remotely hosted software applications.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smart-phones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

A "recent file" as used herein, and throughout this disclosure, refers to a list of files which defines files that have been opened/saved/edited by a user recently. A recent file list may be limited, for example, to a predetermined time period or a fixed number of files.

A "client device" as used herein, and throughout this disclosure, refers to a PED or FED upon which a user can access directly a file or files which are stored locally upon the PED or FED, which are referred to as "local files", and/or a file or files which are stored remotely to the PED or FED, which are referred to as "remote files", and accessed through one or more network connections or interfaces to a storage device.

A "local file" as used herein, and throughout this disclosure, refers to a file, i.e. electronic content, which is stored directly upon a client device, e.g. a PED or FED, within a file system of the client's device.

A "remote file" as used herein, and throughout this disclosure, refers to a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

A "recent file" or "recent files" as used herein, and throughout this disclosure, refers to either a single item of electronic content or multiple items of electronic content that have been at least one accessed, generated, and modified by a user or users. These represent a subset of files stored within one or more memories. Accordingly, a recent file or recent files represents an electronic registry of electronic content accessed where this specific electronic registry is a predetermined portion of the overall electronic content stored within the one or more memories tracked by other global electronic registries or file management systems for the one or more memories. Those files within this specific electronic registry (recent files) being established in dependence upon a predetermined criterion, such as the last predetermined number of files (electronic content) accessed, those files accessed within a predetermined period of time prior to a current point in time, etc.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "Content Resource Locator" (CRL schema) as used herein, and throughout this disclosure, refers to a scheme of storing metadata relating to an item of electronic content according to a defined format such that another electronic device can access the stored electronic content based upon extracting metadata from a link, electronic record, generated with the CRL schema. This CRL schema may define, for example, the electronic address of a device which can access the electronic content from a memory, an identity of the electronic content, a location of the electronic content within the memory within which it is stored, time and/or date information relating to when it was stored, access credentials required to access the electronic content, a limitation with respect to users who can access the electronic content, an identity of an application which generated the electronic content, an identity of an application to access the electronic content, and an identity of a user generating the electronic content.

A "Content Resource Locator" (CRL) as used herein, and throughout this disclosure, refers to an element generated by or with a CRL schema comprising metadata relating to an item of electronic content according to a defined format such that an electronic device can access the stored electronic content based upon extracting metadata from the CRL. Within embodiments of the invention the CRL may include, but not be limited to, an address, a link, or an electronic record. Within embodiments of the invention a CRL and/or a CRL schema may be common to all electronic devices, systems, etc. generating, storing, and/or accessing electronic content within one or more memories. Within other embodiments of the invention CRLs and/or CRL schema may vary between different subsets of electronic devices, systems, etc. generating, storing and/or accessing electronic content within one or more memories such that the CRLs and/or CRL schema may be processed and/or parsed only by those devices within a specific subset of electronic devices, systems, etc. or devices within multiple or all subsets of the electronic devices, systems, etc. may all process and/or parse the CRL.

A "demilitarized zone" (commonly referred to as a DMZ, perimeter network or screened subnet) as used herein, and throughout this disclosure, refers to a physical or logical subnetwork that contains and exposes an organization's or enterprise's external-facing services to an untrusted network, usually a larger network such as the Internet. Accordingly, the DMZ adds an additional layer of security to an organization's local area network (LAN) wherein an external network node can access only what is exposed in the DMZ, while the rest of the organization's network is firewalled behind the DMZ. The DMZ functions as a small, isolated network positioned between the Internet and the private network of the organization and/or enterprise.

Now referring to FIG. 1 there is depicted a network environment 100 within which embodiments of the invention may be employed supporting software, systems, applications, and platforms (SSAPs) according to embodiments of the invention. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160 within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are:
Social Networks (SOCNETS) 165 providing access to social media profiles, posted electronic content, posted file(s), etc.;
First remote system 170A, such as associated, for example, with an Original Equipment Manufacturer (OEM) or manufacturer providing online files accessible to a user from their PED and/or FED;
Second remote system 170B, such as associated, for example, with an online software application accessed by a user from their PED and/or FED through a web browser interface hosting remote files for example;
Third remote system 170C, such as associated, for example, with a retailer and/or online retailer providing online files accessible to a user from their PED and/or FED;
Fourth remote system 170D, such as associated, for example, with a provider of cloud storage providing online files accessible to a user from their PED and/or FED;
Fifth remote system 170E, such as associated, for example, with a provider of a file conversion services, such as translation, format conversion, etc. which are stored remotely for subsequent access by a user;
First website 175A, such as associated, for example, with an online repository of files and/or electronic content such as Wikipedia™, Google™ Scholar, ResearchGate™, etc.;
Second website 175B, such as associated, for example, with an online repository for electronic content such as YouTube™, Vimeo™, MusicBrainz™, etc.;
First third ($3^{rd}$) party provider 175C, such as associated, for example, with an online repository of user specific data such as Microsoft™ OneDrive etc.;
Second 3rd party provider 175D, such as associated, for example, with an online repository of files such as Mega™, Dropbox™, Google Drive™ allowing users to upload content and provide access and/or shareable links to the uploaded content;
Third 3rd party provider 175E, such as associated with an enterprise being an employer and/or client of a user providing one or more shared drives/repositories for files accessible to the user with provisioning of the appropriate credentials (where required);
First to third servers 190A to 190C respectively which together with others, not shown for clarity which provide storage for files accessible to the user either directly or indirectly from one or more of the first to fifth remote systems 170A to 170E respectively and/or one of first and second websites 175A and 175B, first to third 3rd party providers 175C to 175E respectively.

Accordingly, a user employing one or more SSAPs may interact with one or more such providers, enterprises, service providers, retailers, third parties etc. and other users. First and second servers 190A and 190B may host according to embodiments of the inventions multiple services associated with a provider of software, systems, applications, and platforms (SSAPs); a provider of a SOCNET or Social Media (SOME) exploiting SSAP features; a provider of a SOCNET and/or SOME not exploiting SSAP features; a provider of services to PEDS and/or FEDS; a provider of one or more aspects of wired and/or wireless communications; an Enterprise 160 exploiting SSAP features; license databases; content databases; image databases; content libraries; customer databases; websites; and software applications for download to or access by FEDs and/or PEDs exploiting and/or hosting SSAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading/installing an application which provides SSAP features according to embodiments of the invention; execute an application already installed providing SSAP features; execute a web based application providing SSAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Now referring to FIG. 1 there is depicted an electronic device 104 and network access point 107 supporting SSAP features according to embodiments of the invention. Electronic device 104 may, for example, be a PED and/or FED and may include additional elements above and beyond those described and depicted. Also depicted within the electronic device 104 is the protocol architecture as part of a simplified functional diagram of a system 100 that includes an electronic device 104, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Also connected to the network 100 are Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multi-media protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

One or more other devices, referred to as ASsociated DEVices (ASDEVs), not depicted for clarity may be coupled to the Electronic Device 204 through a wireless interface or wired interface, or optical interface. Such ASDEVs may include, but not be limited to, a wearable device, a PED, a FED, a medical implant etc.

The Front End Tx/Rx & Antenna 228A wirelessly connects the Electronic Device 204 with the Antenna 228B on Access Point 206, wherein the Electronic Device 204 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the ASDEV with associated Electronic Device 204 may accordingly download original software and/or revisions for a variety of functions. In some embodiments of the invention the functions may not be implemented within the original as sold ASDEV and are only activated through a software/firmware revision and/or upgrade either discretely or in combination with a subscription or subscription upgrade for example. Accordingly, as will become evident in respect of FIGS. 3 to 14 respectively the Electronic Device 204 may provide the user with access to one or more SSAPs including, but not limited to, software installed upon the Electronic Device 204 or upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following descriptions in respect of FIGS. 3 to 14 respectively a remote system/server may form part or all of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively. Within the following descriptions in respect of FIGS. 3 to 14 respectively a local client device may be Electronic Device 204 such as a PED or FED and may be associated with one or more of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively. Similarly, a storage system/server within the following descriptions may form part of or be associated within one or more of the following descriptions in respect of FIGS. 3 to 14 respectively a remote system/server may form part of all of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively.

Within existing software applications, a user may access from their PED and/or FED acting as a client device multiple files which may be stored either locally, as local files, or remotely, as remote files. Many of these applications are configured such that the application only provides a listing of these recently accessed files, recent files, where these are stored locally. Accordingly, these applications do not provide the user with access to information relating to files that are used/created/edited upon one or more remote systems.

Whilst other software applications are configured to provide a user with a recent file list of both files locally and/or remotely stored, such as Microsoft Office applications such as Word, PowerPoint, Excel etc., these files are again only those accessed through each specific application. Further, some applications, again such as Microsoft Office applications such as Word, PowerPoint, Excel etc., also provide the user with access to directories within which files within the recent files are associated with and therein access other directories within the same file directory to which the user has permission to access. However, the files accessible are limited to the file type associated with the application, e.g. Microsoft™ PowerPoint only allows the user to view a list of recent PowerPoint files whilst Microsoft™ Word only allows the user to view a list of recent Word files.

Further some applications allow a user to "pin" a recent file within the listing of recent files so that even if they do not access it for a period of time greater than the time duration for which recent files are tracked/listed or has accessed a number of files greater than the maximum number of files stored within the recent file listing then the "pinned" file is still listed within the recent file listing.

Further, in many instances the information within these recent files listings within a software application is incorrect. For example, if a user "unpins" a pinned file within a file listing then this action is logged and the date of unpinning the pinned file becomes the last action date for the file such that it becomes the most recent file even though the user has not accessed it but rather has managed the metadata of the application for the pinned and now unpinned file.

In many instances a user will generate a new file which they access temporarily in their work which is subsequently not stored by the user within either a local file system or remote file system. However, this file may be stored by the application automatically under an application generated file identity in case of an issue with the client device and/or application. Accordingly, it would be beneficial in some instances for these non-user initiated file saves to be included within the recent file listing. For example, if a user copies or cuts electronic content into a temporary file to subsequently use in amending the file they copied it from or adding to another document providing access to the temporarily stored file automatically generated by the application and/or client device may allow the user to subsequently access this again without having to remember what electronic content they copied/pasted or cut/pasted.

Accordingly, it would be beneficial to provide a user with a consistent user experience in respect of providing both local files and remote files within a software application whether the application is a local application stored upon the user's client device or a remote application accessed by the user through a web interface, for example, on the user's client device. Further, it would be beneficial for the recent files rendered to the user to be independent of the software application rendering the recent file listing to the user such that a user can easily access recent files independent of which application they are currently within so that they do not have to remember which application they employed for a specific file in order to access it. Further, it would be beneficial for the recent file listing to be accessible within other applications other than word processing, spreadsheet, presentation etc. such that the recent file listing can be accessed for example from a web browser, file manager etc. thereby reducing the time the user takes to find a file or files and increasing the user's work efficiency.

Figure 3:
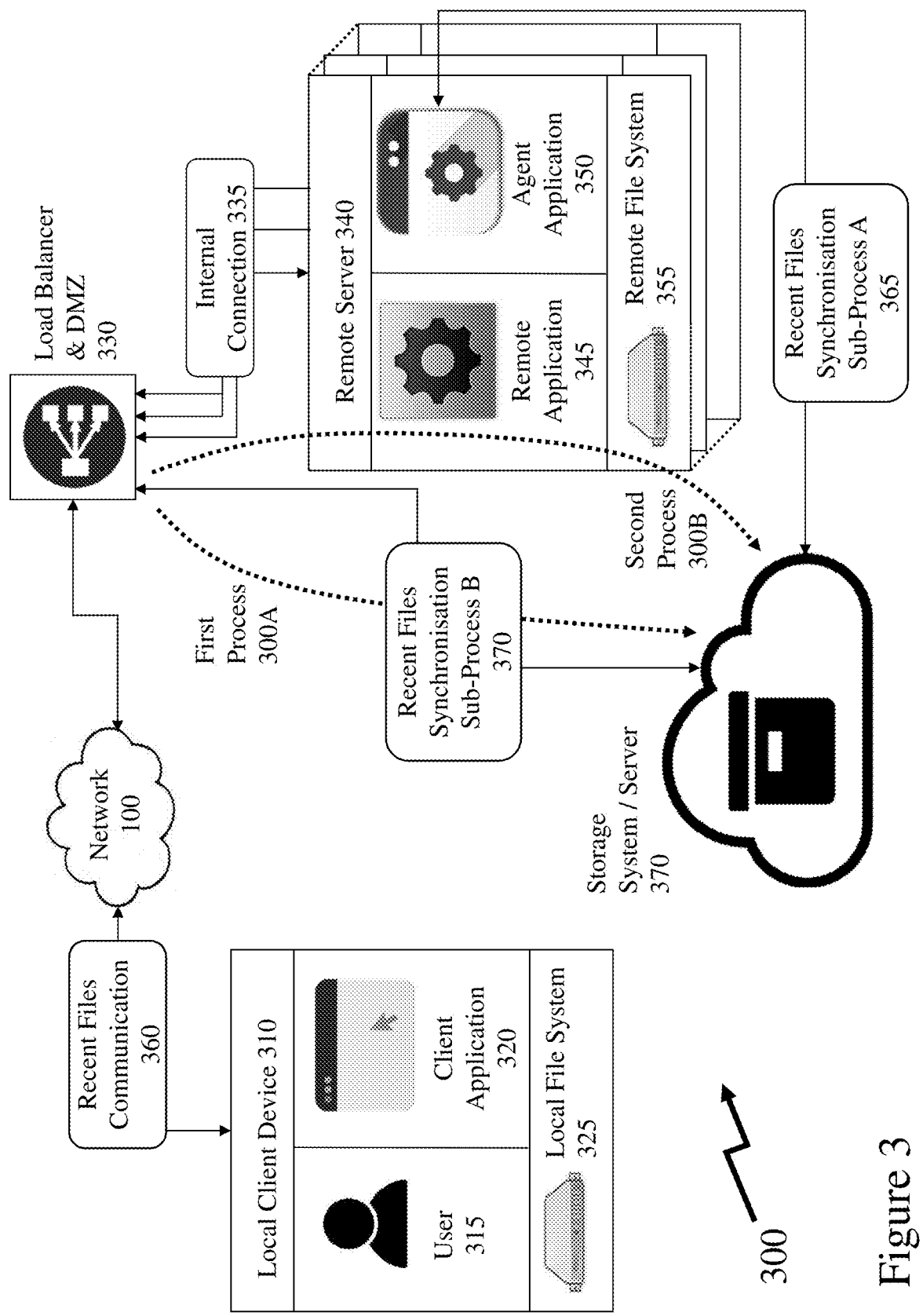
FIG. 3 depicts an exemplary system configuration according to an embodiment of the invention with exemplary data flows for recent file integration/synchronization.

Referring to FIG. 3 there is depicted an exemplary system configuration, System 300, according to an embodiment of the invention with exemplary data flows for recent file integration/synchronization. Accordingly, as depicted the System 300 delivers applications, running on a Remote Server 340 to Local Client Device 310. An example of such as system being Parallels™ Remote Application Server (also known as Parallels RAS™) which is a virtualization software application produced and marketed by Parallels (a subsidiary of Corel Corporation) that allows Windows applications to be accessed via individual devices from a shared server or cloud system. The Local Client Device 310 represents an element of hardware, e.g. a PED or FED, which is capable of running one or more Client Applications which is physically available to a User 315. The Local Client Device 310 accesses a Load Balancer and DMZ (LB-DMZ) 330 via the Network 100. The LB-DMZ 330 comprises a mix of hardware, firmware, and software components that are capable of processing Client Application connections and routing them to the most suitable Remote Server 340 via one or more Internal Connection(s) 335.

Accordingly, the Remote Server 340 is a server to which the User 315 has no physical access to and that is capable of running applications in remote sessions, for example a Remote Desktop Session Host (RDSH), a desktop virtualization application, a mobile virtualization application, and an X Server. Also depicted is a Storage System/Server 370 which can provide additional optional components such as authentication and/or shared access to data capabilities, for example, to Client Application(s) 320 in execution upon the Local Client Device 310. As depicted the Local Client Device 310 comprises one or more Client Applications 320 and a Local File System 325 whilst being associated with a User 315. The Remote Server 340 as depicted comprises a Remote Application 345, Agent Application 350 and Remote File System 355.

The System 300, as will become evident in respect of embodiments of the invention in FIGS. 4 to 8 respectively provides a smooth and consistent user experience when exploiting "Recent Files" in conjunction with both Local Applications and Remote Applications. Embodiments of the invention may in addition to the configurations accessing Remote Servers 340 also operate and/or support system configurations where the Remote Server 340 is running on a Local Client Device 310 as a virtual machine, for example Parallels™ Desktop. Accordingly, a Recent Files Communication 360 is routed from the Client Application 320 in execution upon the Local Client Device 310 via the Network 100 to the LB-DMZ 330 resulting in a first process 300A and/or a second process 300B being executed.

As depicted in System 300 the first process 300A comprises one or more Internal Connections 335 being established to Remote Servers 340 wherein the Agent Application(s) 350 trigger a Recent File Synchronisation Sub-Process A 365 between the Agent Application(s) 350 upon the Remote Servers 340 and the Storage System/Server 370. Optionally, Recent File Synchronisation Sub-Process A 365 may be one of a plurality of sub-processes triggered by the Remote Server(s) 340. Alternatively, the Recent File Synchronisation Sub-Process A 365 may be triggered by the Storage System/Server 370 in response to a Recent File Synchronisation Sub-Process B 370 received by the Storage System/Server 370 from the LB-DMZ 330.

As depicted in System 300 the second process 300B comprises a Recent File Synchronisation Sub-Process B 370 between the LB-DMZ 330 and the Storage System/Server 370. Optionally, Recent File Synchronisation Sub-Process B 370 may be one of a plurality of sub-processes triggered by the LB-DMZ 330. Alternatively, the Recent File Synchronisation Sub-Process B 370 may be triggered by the Storage System/Server 370 in response to a Recent File Synchronisation Sub-Process A 365 received by the Storage System/Server 370 from the Remote Server(s) 340.

Direct Communication Modes

Remote to Local "Recent Files" Integration Workflow

Figure 4:
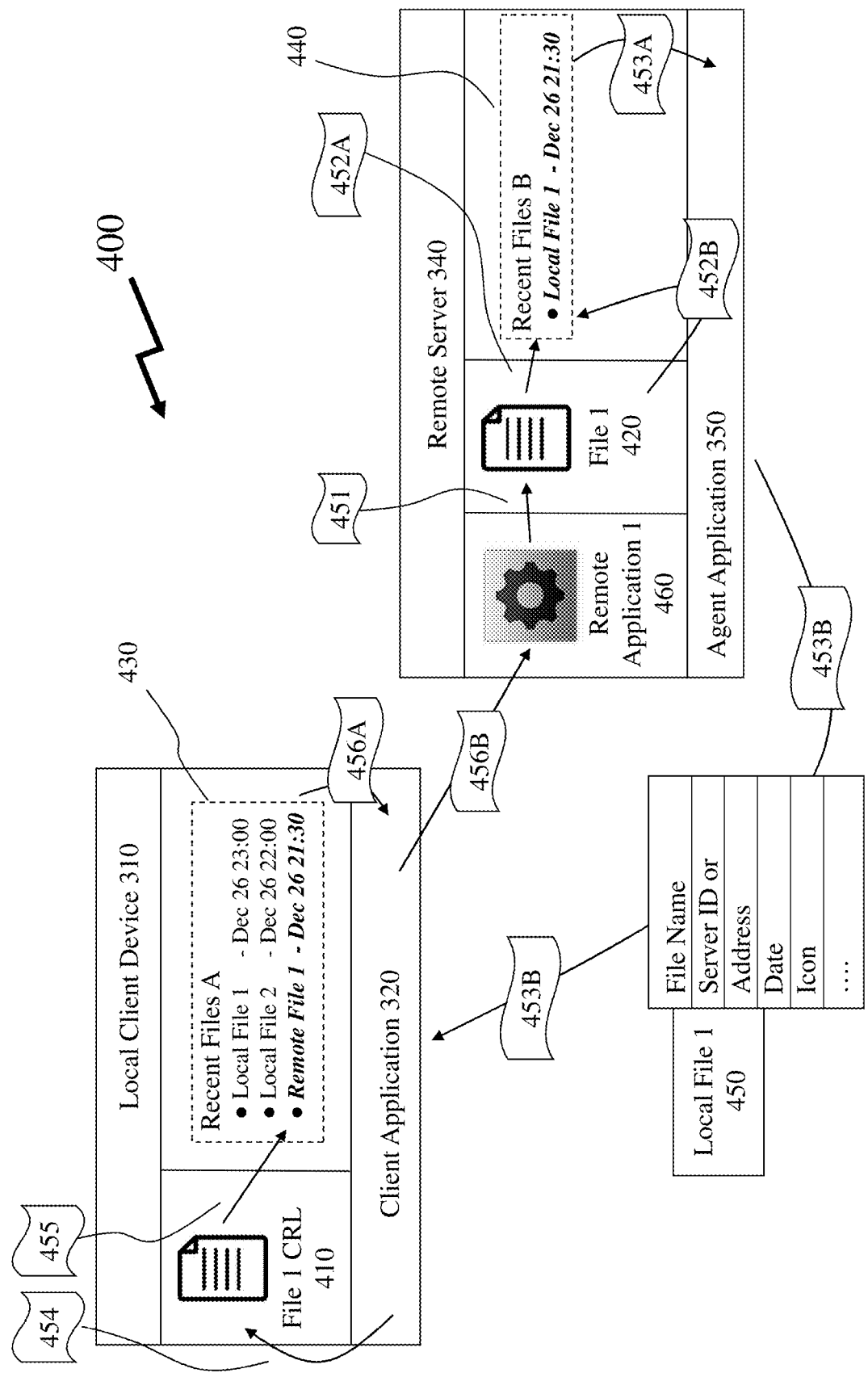
FIG. 4 depicts an exemplary system configuration according to an embodiment of the invention with exemplary data flows for recent file integration/synchronization of remote files to local files.

Referring to FIG. 4 there is depicted a Remote to Local "Recent Files" Integration Workflow (R2L Integration Workflow) 400 as supported by applications and/or systems exploiting embodiments of the invention. As depicted in R2L Integration Workflow 400 the components of the system are:

Local Client Device 310 with a Client Application 320 in execution; and
Remote Server 340 with a Remote Application 1 460 and Agent Application 350.

Accordingly, the Remote Application 1 460 creates a new file or modifies an existing file referred to in either instance as File 1 420 through First Workflow Element 451. The Remote Server 340 through its Operating System (OS) detects the file write/read operations arising from the Remote Application 1 460 which is running under a user session from a user upon the Local Client Device 310 through the Client Application 320. Accordingly, the OS establishes Second Workflow Element 452A which establishes a link to the File 1 420 and adds that link to the Recent Files 440 upon the Remote Server 340. This being denoted by "Local File 1—Dec 26 21:30" in FIG. 4.

Alternatively, where the OS of the Remote Server 340 does not support "Recent Files" then the Agent Application 350 is employed to track files, e.g. File 1 420, opened and/or saved to by applications running under the user session. Accordingly, the Agent Application 350 establishes Third Workflow Element 452B which adds the link to the Recent Files B 440. In either scenario the Agent Application 350, installed on the Remote Server 340, tracks changes in "Recent Files" and sends an event to the Local Client Device 310 with Fourth Workflow Element 453A and Fifth Workflow Element 453B. As depicted, this comprises transfers metadata Local File 1 450 from the Agent Application 350 to the Client Application 320. This Local File 1 450 may contain, for example, a metadata description of the file such as its storage location, an identity of the application used to edit/generate/copy the file, a date of the activity relating to File 1 420, an icon of File 1 420, as well as other necessary file attributes.

Accordingly, the Client Application 320 receives the Local File 1 450 and generates a special link, File 1 CRL 410, through Sixth Workflow Element 454 which includes all the information necessary to open the same file, File 1 420, on a remote host using either the same application or a default system application associated with the file extension. This information may include, but not be limited to:

File name.
Icon.
File path on remote server.
Modification date.
Connection parameters, for example, connection server identity/address and published application name.
Application used to open the file.

The File 1 CRL 420 may be established using a Universal Resource Locator (CRL) schema. This CRL schema may, for example, be specific to the user, the Client Application 320, the OS of the Local Client 310, an organization or enterprise associated with the Local Client Device 310 and/or the user, etc. or a general CRL schema. The resulting CRL schema, File 1 CRL 410, is then stored within the Recent Files A 430 upon the Local Client Device 310 with Seventh Workflow Element 455. This being depicted in Recent Files A 430 through the entry "Remote File 1—Dec 26 21:30." Accordingly, the Client Application 320 may access Recent Files A 430 to render this to the user within the Client Application 320 and upon selection of an entry, e.g. "Remote File 1—Dec 26 21:30" triggers Eighth Workflow Element 456A which then triggers Ninth Workflow Element 456B wherein the Client Application 320 on the Local Client Device 310 accesses the Remote Application 1 460, which is defined within the CRL schema associated with the entry "Remote File 1—Dec 26 21:30" in Recent Files A 430 and therein access to the File 1 420.

Within embodiments of the information it would be evident that the Remote Server 340 may vary with either the initial session of the Client Application 320 with the Remote Application 1 460 or subsequent sessions, e.g. re-accessing a file to edit, review, read, etc. This arises as the LB-DMZ disposed within the System 300 in FIG. 3 may direct the request to a different Remote Server 340 of a plurality of Remote Servers 340 based upon the current loading of the Remote Servers 340. Accordingly, in this instance the Remote Servers 340 may either be configured identically and have access to the Recent Files B 440 by the same path which may for example be achieved through the use of one or more network shares or user profile, for example, as well as other techniques known in the art. Alternatively, within another embodiment of the invention the Recent Files B 440 may be stored within the LB-DMZ or another device (hereinafter referred to as Database Device and not depicted for clarity) behind the firewall such that the Remote Application 1 460 and/or the Client Application 350 communicate the updated information to the Database Device such that the Recent Files B 440 is maintained in a centralized location. In these embodiments of the invention the communication denoted by Fourth and Fifth Workflow Elements 453A and 453B would be replaced by an initial call from the Agent Application 350 to the Database Device and therein a subsequent communication of the Local File 1 450 from the Database Device to the Client Application 320 upon the Local Client Device 310.

Accordingly, the R2L Integration Workflow 400 generates for every new file added, or file modification made to an existing file, on the Remote Server 340 an entry into Recent Files B 440 on Remote Server 340 and an entry into Recent Files A 430 on the Local Client Device 310. The entry within Recent Files A 430 comprising metadata such as a creation/modification date which is inherited from the original file, e.g. File 1 420, on the Remote Server 340 as entered within the Recent Files B 440.

It would be evident that the R2L Integration Workflow 400 may result in multiple files remotely stored being represented within a common local "Recent Files." Further, as both the Recent Files A 430 and Recent Files B 440 are stored independent of the specific Client Application 320 and Remote Application 1 460 respectively the resulting local representation, Recent Files A 430, on the Local Client Device 310 can be accessed by multiple Client Applications 320.

Whilst within the descriptions of embodiments of the invention in respect of FIGS. 3 and 4 above and FIGS. 5 to 14 below the generation of an entry within a "Recent Files" list is described with respect to the generation of a new file or a modification to an existing file triggered by the user. However, it would be evident to one of skill in the art that such entries may also arise from automatic actions of the software application the user is employing or has accessed, commonly referred to as automatic save or auto-save. Further, new entries within the "Recent Files" list may also be generated from other actions such as copying ad pasting etc. without departing from embodiments of the invention.

Figure 5:
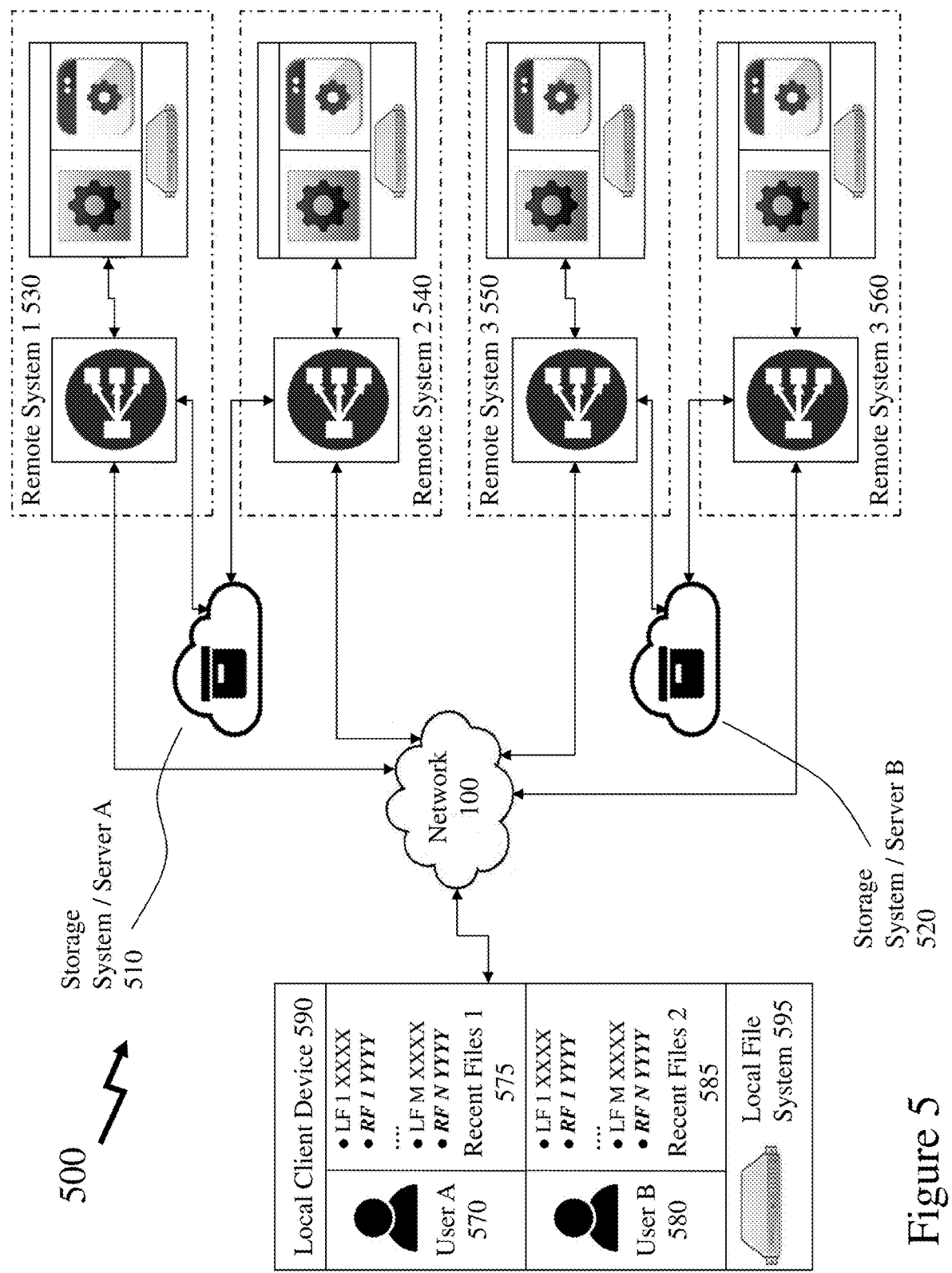
FIG. 5 depicts an exemplary system configuration according to an embodiment of the invention for recent file integration/synchronization of remote files to local files for multiple users upon a single local client device and multiple remote systems.

Further, it would be evident to one skilled in the art that as R2L Workflow 400 as supported, for example by System 300 in FIG. 3, may be replicated as depicted in FIG. 5 where a Remote System 1 530 and a Remote System 2 540 are each accessible from Local Client Device 590 via Network 100 and are each in communication with Storage System/Server A 510 (which is optional as discussed above in respect of System 300 in FIG. 3). Similarly, a Remote System 3 550 and a Remote System 4 560 are each accessible from Local Client Device 590 via Network 100 and are each in communication with Storage System/Server A 510 (which is optional as discussed above in respect of System 300 in FIG. 3). The Local Client Device 590 comprises a Local File System 595 and is associated with multiple users, for example User A 570 and User B 580. Where User A 570 and User B 580 access Local Client Device 590 only upon providing appropriate credentials, e.g. a user name or user identifier and a password/access credential, then the Local Client Device 310 may maintain discrete "Recent Files" for each user such that User A 570 when exploiting a Local Application, not depicted for clarity, is presented with Recent Files 1 575 whilst User B 570 when exploiting the same Local Application or different Local Applications, not depicted for clarity, is presented with Recent Files 2 585.

Optionally, within another embodiment of the invention the Local Client Device 590 and Local File System 595 store a single "Recent Files" listing wherein the metadata for each entry now includes the user name or user identifier (or other uniquely identifiable cross-reference to the user accessing the Local Client Device 590 when the modification to the remote system is made) and this common "Recent Files" list is parsed/filtered prior to rendering to the user in dependence upon the user name or user identifier associated with the current user logged in on the Local Client Device 590.

Optionally, within another embodiment of the invention different remote systems may be connected to different networks rather than a common network. Accordingly, for example Remote System 1 530 may be connected to a dedicated Ethernet based network of an enterprise or organization associated with the users and/or Local Client Device 590 whilst Remote System 2 540 and Remote System 3 550 are connected to the Internet and Remote System 4 550 is a network accessible wirelessly to Local Client Device 590. It would be evident that other configurations of subsets of remote systems with different networks and/or communication protocols and/or wired/wireless/optical communications may be supported by embodiments of the invention. Similarly, whilst FIG. 5 only depicts a single Local Client Device 590 it would be evident that multiple local client devices may be connected to one or more networks and accordingly in different subsets to one or more remote storage systems etc.

Optionally, within embodiments of the invention a remote system may be determined in dependence upon one or more factors including, but not limited to:
the local application used by the user;
the remote application being accessed by the user;
the time of access;
a date of access;
a regulatory requirement;
a geographical determination of the location of the local client device;
a security credential entered by the user, an access right associated with the user;
a wearable device associated with the user and associated by a local communications protocol to the local client device;
one or more elements of biometric information relating to the user acquired by the local client device directly or via one or more wearable devices;
an enterprise or organization associated with the local client device and/or user; and
an enterprise or organization associated with the remote application or remote service accessed by the user.

As noted in respect of FIGS. 3 and 4 the "Recent Files" upon the Local Client Device exploits a CRL schema. This CRL schema allows for the performance or execution of different actions in applications upon the local client device or in the OS of the local client device on behalf of a client application on the local client device. Once activated the link according to the CRL schema leads to the client application establishing a connection with a remote server, starting a logon session and opening the specified file using specified a remote application. Optionally, the logon session may be automatically performed based upon the previous validation of the user on the local client device through their provisioning the appropriate security credentials to access the local client device. Optionally, the logon session may not be automatically performed based upon the previous validation of the user on the local client device and require the user to provision the appropriate security credentials to access the remote application and/or remote system.

Figure 6:
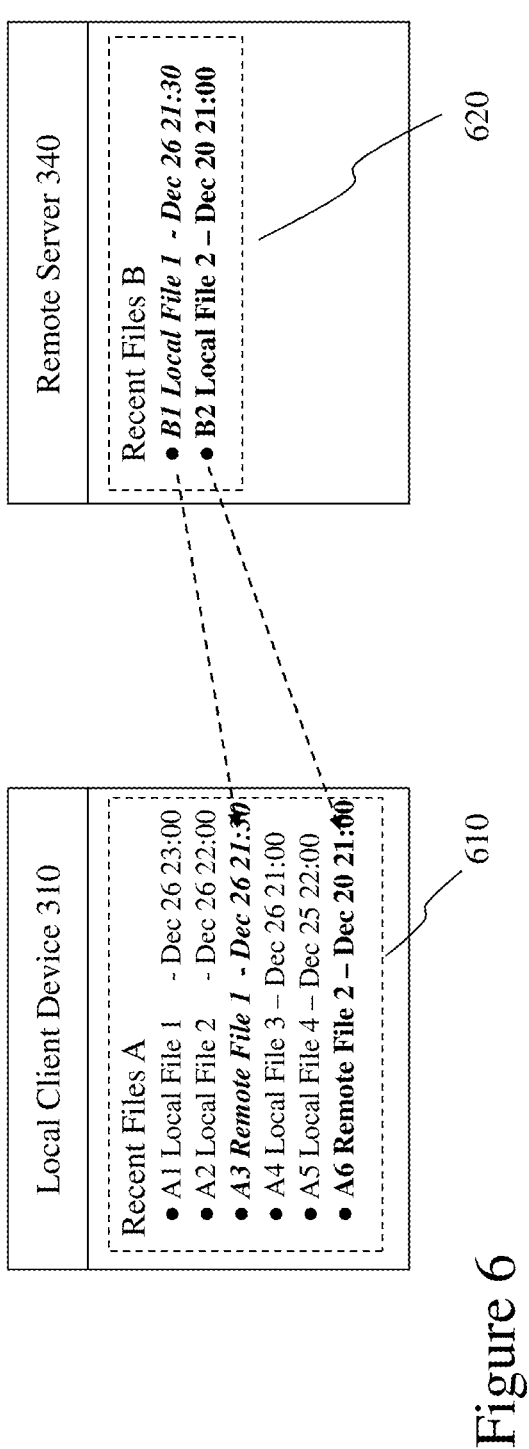
FIG. 6 depicts exemplary recent file listings according to an embodiment of the invention with multiple remote "recent files" represented within a local "recent files" listing.

Referring to FIG. 6 there is depicted exemplary recent file listings according to an embodiment of the invention with multiple remote "recent files" represented within a local "recent files" listing. Accordingly, there are depicted Recent Files A 610 upon a Local Client Device 310 and Recent Files B 620 upon Remote Server 340. It is noted the identifiers such as "A" and "B" attached to "Recent Files" are for differentiation in respect of the "Recent File" listings on different devices/systems. Similarly, the use of italics/bold are for visually differentiating elements of the content within the Figures. However, within embodiments of the invention content within a "Recent Files" which is locally stored may be visually differentiated to the user with respect to the content within the "Recent Files" which is remotely stored. Such visual indications may include, but not be limited to, font, colour, bold, italic, a font characteristic, temporal variations of content, and variations in icons. Optionally, this may be extended such that different remote storage systems are differentiated in similar manner.

Optionally, a user may have multiple user identities/accounts active and the content of the "Recent Files" may be differentiated to the user based upon these identities or in dependence upon which identity (identities) they are currently logged in for. Optionally, a user may be presented with visual indications of remote files which require additional credentials to access versus those that do not etc. Similarly, visual indications of other characteristics of the files may also be presented within the "Recent Files" such as is a file encrypted, is a file locked, As depicted Recent Files B 620 contains two entries, namely:

B1: Local File 1—Dec 26 21:30; and
B2: Local File 2—Dec 20 21:00.

In contrast Recent Files A 610 contains six entries, namely:

A1 Local File 1—Dec 26 23:00;
A2 Local File 2—Dec 26 22:00;
A3 Remote File 1—Dec 26 21:30;
A4 Local File 3—Dec 26 21:00;
A5 Local File 4—Dec 25 22:00; and
A6 Remote File 2—Dec 20 21:00.

Within Recent Files A 610 the entries A3 and A6 denote "remote" and have date and time metadata which aligns with B1 and B2 respectively within the Recent Files B 620. This arises as they are the same file, stored upon Remote Server 340 with the metadata transferred to Local Client Device 310 for inclusion within the Recent Files A 610.

Local to Remote "Recent Files" Integration Workflow—Bidirectional Integration

Within an alternate embodiment of the invention the concepts described above in respect of FIGS. 3 to 5 respectively may be extended to support bidirectional integration such that the "Recent Files" on both the local client device and remote server or remote storage are "synchronized" and the CRL schema, processing and application launching together with the other functionalities described with respect to the R2L Integration Workflow 400 in FIG. 4 are supported in both the local and remote environments. This being referred to hereinafter as a Bidirectional Integration Workflow. Accordingly, such embodiments of the invention support delivering "Recent Files" both ways, namely from local client device to remote server/system and remote server/system to local client device simultaneously. Accordingly, a user initially accessing upon a local client device may be presented with a coherent combined "Recent Files" of files upon both local storage and remote storage can subsequently access a remote application from the same local client device or another local client device and be presented with the coherent combined "Recent Files." Accordingly, irrespective of whether a user accesses, for example, a word processing application from their personal laptop computer, their work computer, or their personal smartphone maintains a consistent view of their "Recent Files" as in each instance the local client device(s) and remote storage device(s) maintain a consistent listing of recent files.

Figure 7:
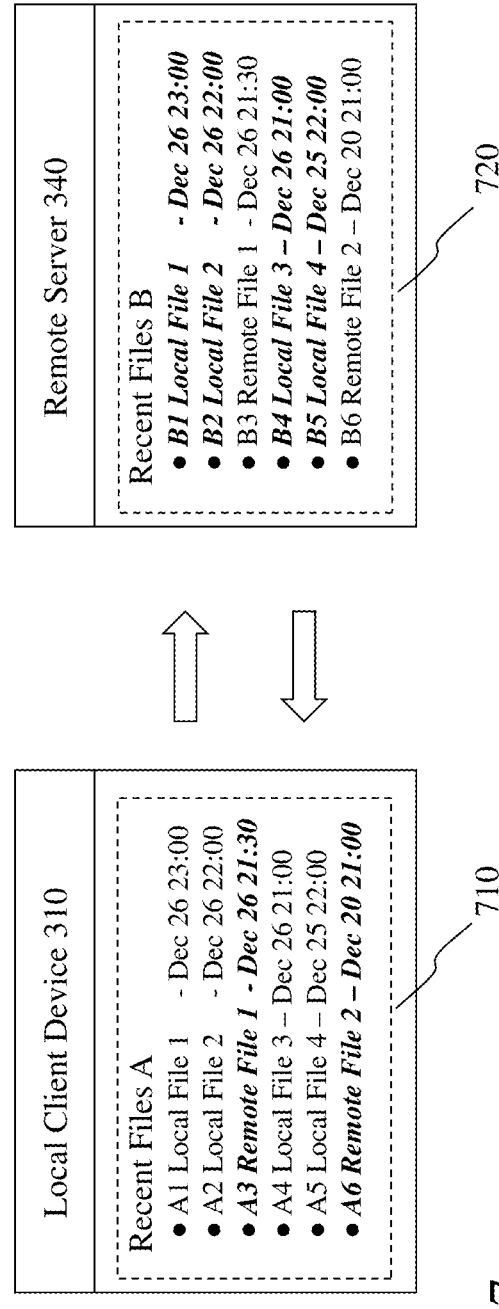
FIG. 7 depicts exemplary two way integration flows according to an embodiment of the invention for integrating remote "recent files" and local "recent files"

This is depicted in FIG. 7 wherein Recent Files A 710 upon a Local Client Device 310 contains six entries, namely:

A1 Local File 1—Dec 26 23:00
A2 Local File 2—Dec 26 22:00
A3 Remote File 1—Dec 26 21:30
A4 Local File 3—Dec 26 21:00
A5 Local File 4—Dec 25 22:00
A6 Remote File 2—Dec 20 21:00

Recent Files B 720 upon Remote Server 340 similarly contains six entries, namely:

B1 Local File 1—Dec 26 23:00
B2 Local File 2—Dec 26 22:00
B3 Remote File 1—Dec 26 21:30
B4 Local File 3—Dec 26 21:00
B5 Local File 4—Dec 25 22:00
B6 Remote File 2—Dec 20 21:00

Accordingly, the metadata for Recent File A 710 entry is the same as Recent File B 720 entry. For ease of visualization "Local" relates to a file locally stored upon the respective one of the Local Client Device 310 and Remote Server 320 within which it appears in respect of a file. Similarly, "Remote" relates to a file remotely stored upon the respective other one of the Local Client Device 310 and Remote Server 320 from the device within whose it appears in respect of a file. Hence "A1 Local File 1—Dec 26 23:00" in Recent Files A 710 on Local Device 310 becomes "B1 Remote File 1—Dec 26 23:00" in Recent Files B 720 on Remote Server 320.

Accordingly, in order to achieve this the software applications upon the Local Client Device 310 and Remote Server 320 track changes in "Recent Files" in a similar manner as R2L Integration Workflow 400 in FIG. 4 but on both sides, namely local and remote.

In this manner in addition to direction of metadata in respect of remote "Recent Files" being transferred to the local client device the Bidirectional Integration Workflow also directs metadata for local "Recent Files" to the remote server/system: This is may be achieved, for example, by a client application, such as Client Application 320 in FIG. 3, tracking changes files upon the local client device "Recent Files." The client application then sends an event to an agent application on a remote server, e.g. Remote Application 345 in FIG. 3, which also comprises metadata relating to the file, for example this may include, but not be limited to, a description of a file, its location, an identity of an application used to edit the file, and other necessary file attributes.

Optionally, the metadata transferred in either direction within a Bidirectional Integration Workflow according to an embodiment of the invention may the same whilst in other embodiments of the invention the metadata transferred in one direction may be different to that transferred in the other direction.

Accordingly, in the case of the remote server the agent application generates a special link using an available CRL schema that includes all the information necessary to open the same file on a local client device using either the same application or a default system application associated with the file extension. This may, for example, be in a similar manner as that described above in respect of a CRL schema described in FIG. 3 for opening a file upon a remote server/storage system. In this manner, links within the "Recent Files" are pointing to an agent application installed on a remote device or a client application installed upon the local client device. Each agent application, e.g. Agent Application 345 in FIG. 3, supports the appropriate CRL schema. Hence, when a user opens a client device file from "Recent Files" on a remote device the agent application is called by the CRL schema wherein the agent application communicates with a client application and initiates launching of the file with associated application on the client side.

"Recent Files" Listing in Client Application

As noted above in respect of FIG. 4 a local client device or a remote server may not natively support "Recent Files." Alternatively, the user is limited by a client application's User Interface (UI) only or integration capabilities within the local client device are such that "Recent Files" is disabled (for example in a shared client device usage case). In situations such as these embodiments of the invention support rendering of the "Recent Files" within a client application UI.

Figure 8:
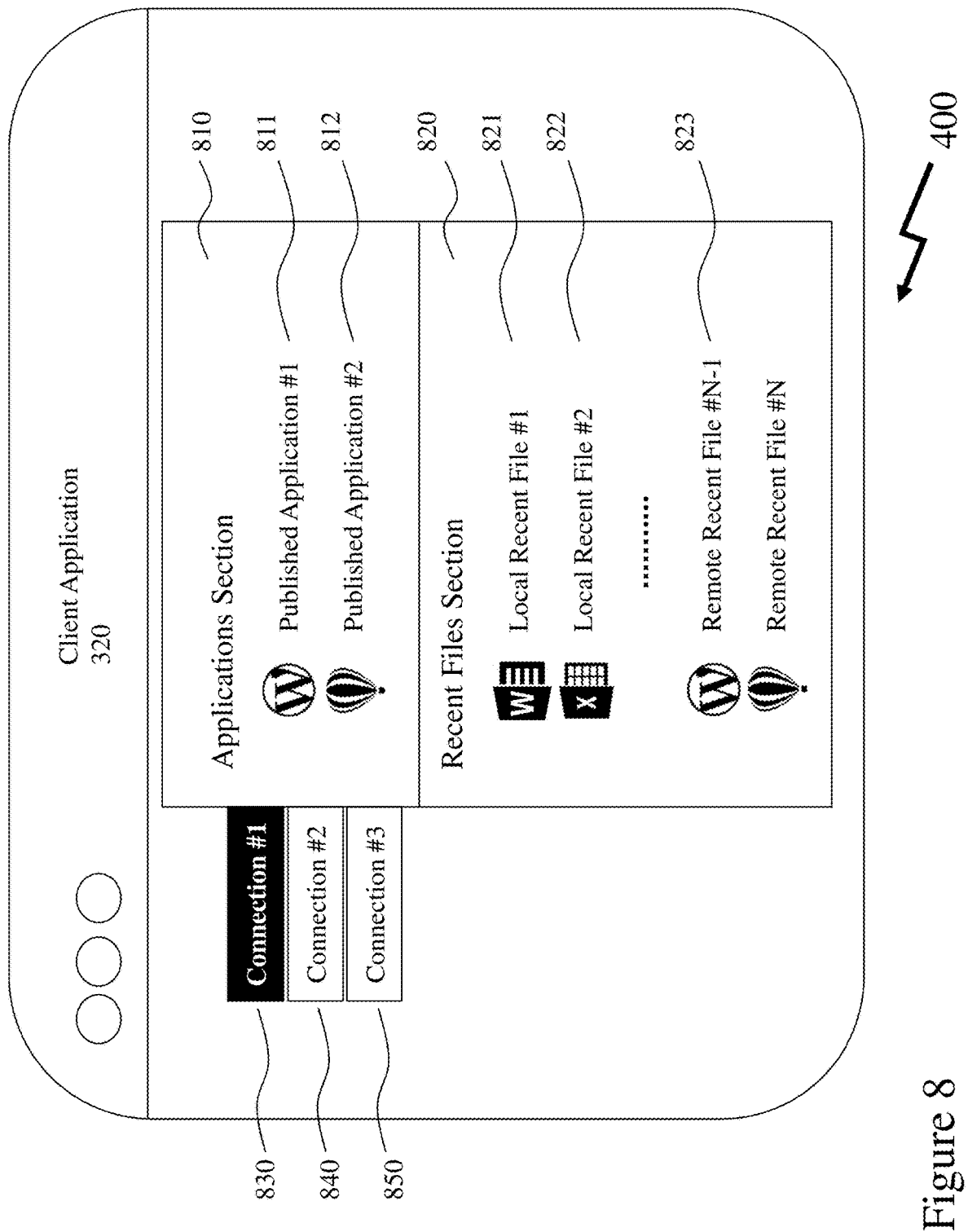
FIG. 8 depicts an exemplary client software application according to an embodiment of the invention combining both application and recent file sections.

Referring to FIG. 8 there is depicted an exemplary client application UI 800 within a Client Application 320 as supported by embodiments of the invention combining both an Applications Section 810 and Recent Files Section 820 for a selected Connection #1 830. Also depicted are other connections accessible to the user within the client application which are denoted as Connection #2 840 and Connection #3 850. For example, each connection of Connection #1 830, Connection #2 840 and Connection #3 850 may represent a different user identity currently active for the user, a different remote storage system or remote server, etc. Optionally, these may all be combined into a single view with or without visual indications to help the user navigate profiles, identities, remote systems etc. Whilst a list with icon based display is presented it would be evident that other display formats such as list, detailed list, icon, tiled, etc. as known in the art may be employed either by default, based upon a user selection, or a user preference.

Accordingly, Applications Section 810 displays to the user two entries, namely:

Published Application 1 811; and
Published Application 2 812.

Selection of either triggers the establishment of the associated remote location, wherein each is displayed within the configuration shown by name and by icon. Published Application 1 811 being WordPress from WordPress Foundation, and Published Application 2 812 being Corel Painter™ from Corel Corporation.

In contrast, the Recent Files Section 820 displays a plurality of entries, namely:

Remote Recent File #1 821;
Local Recent File #2 822;
. . .
Local Recent File #N-1 823; and
Remote Recent File #N 824.

Each entry within the Recent Files Section 820 in the configuration depicted in FIG. 8 including an icon associated with the software application for that file. Accordingly, Local Recent File #1 821 is depicted as associated with Microsoft™ Word, Local Recent File #2 822 with Microsoft™ Excel, Remote Recent File #N-1 823 with WordPress™ and Remote Recent File #N 824 with Corel Painter™. Optionally, Applications Section may also denote local applications as well as remote applications.

Indirect Communication Mode

Within the embodiments of the invention described above in respect of FIGS. 3 to 8 the storage of "Recent Files" has been described in respect of unidirectional and bidirectional metadata transfer from a client device to a remote storage system or remote server. These exemplary embodiments of the invention optionally employing an additional system or device, for example Storage System/Server 370 in FIG. 3, Storage System/Server A 510 in FIG. 5, and Storage System/Server B 520 in FIG. 5. This being described as providing support for additional aspect of the unidirectional and/or bidirectional metadata transfer such as authentication and/or shared access to data capabilities for example.

However, in other embodiments of the invention to improve the user experience further in respect of scenarios where there are several local client devices or a local client device is damaged, destroyed or replaced then an intermedia device, e.g., Storage System/Server 370 in FIG. 3, Storage System/Server A 510 in FIG. 5, and Storage System/Server B 520 in FIG. 5, may discretely or in combination with other aspects of the unidirectional and/or bidirectional metadata transfer. Accordingly, in one embodiment of the invention this intermediate device may discretely store a list of "Recent files" coming from different sources and distributes it among the local client devices. Alternatively, in another embodiment of the invention the "Recent Files" stored by the intermediate device may be synchronized with the remote servers or remote storage in a first set of synchronization operations and then synchronize the local client devices in a second set of synchronization operations. Independent of configuration and synchronization methodology such embodiments of the invention allow for synchronization of remote server "Recent Files" among multiple local client devices.

Figure 9:
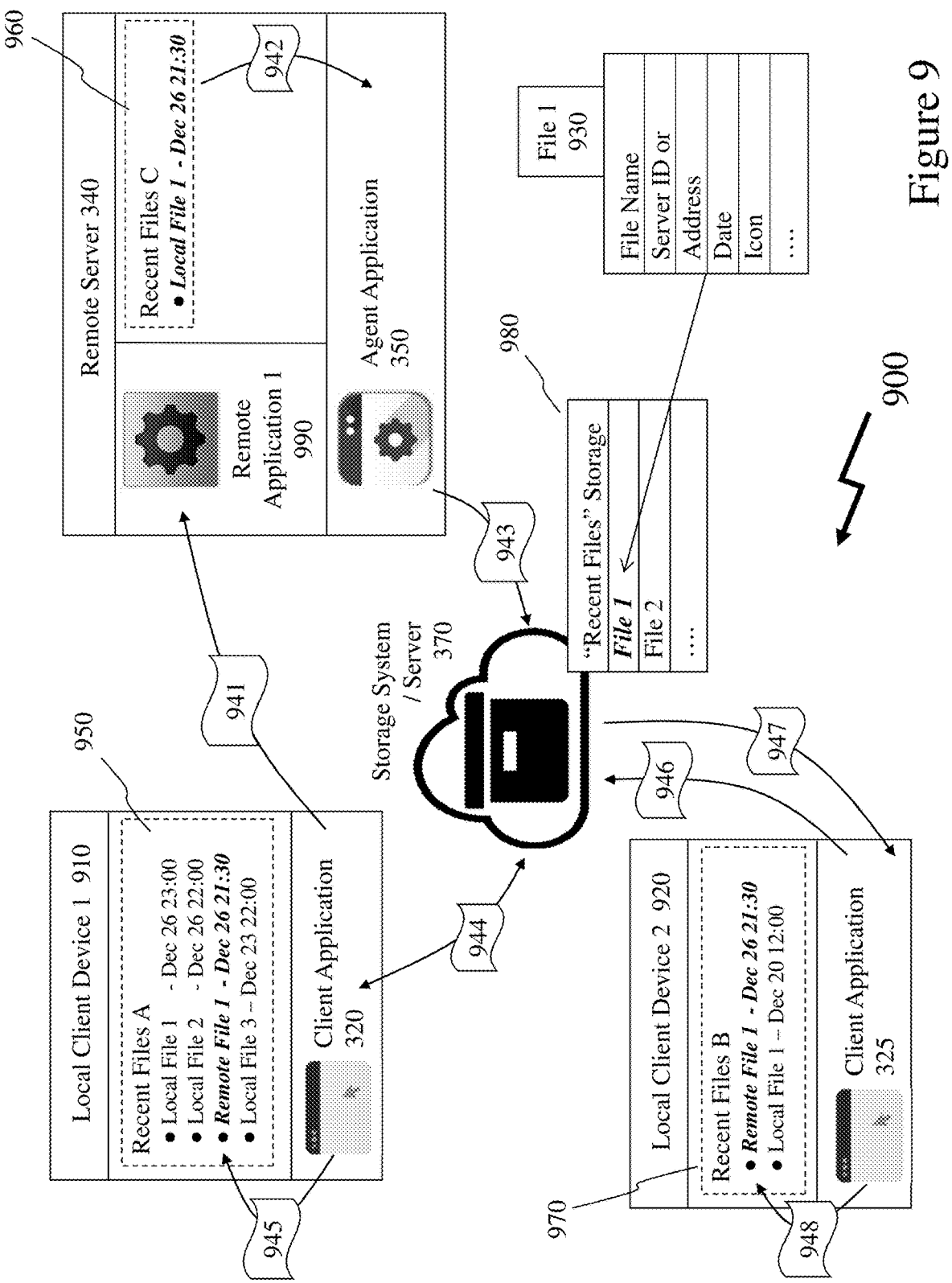
FIG. 9 depicts an exemplary system configuration according to an embodiment of the invention with exemplary data flows for synchronizing recent files across multiple devices.

Accordingly, referring to FIG. 9 there is depicted an exemplary schematic/workflow, Intermediate Workflow 900, according to an embodiment of the invention wherein synchronization of "Recent Files" across multiple local client devices, depicted as Local Client Device 1 910 and Local Client Device 2 920, with a Remote Server 340 via an intermediate device, Storage System/Server 370. Accordingly, as the result of a session enabled through Client Application 320 upon Local Client Device 1 910 then the Remote Application 1 990 upon the Remote Server 340 either creates a new file or modifies an existing one. This being depicted as First Workflow Element 941. Accordingly, the OS of the Remote Server 340 detects the file write/read operation from the Remote Application 1 990 running under the user session from Local Client Device 1 910 and establishes a link for the file within the Recent Files C 960 upon the Remote Server 340 via Second Workflow Element 942.

At this point Agent Application 350, installed on the Remote Server 350, tracks changes in Recent Files C 960 and triggers the transmission of an event to Recent Files Storage 980 upon the Storage System/Server 370 via Third Workflow Element 943 which includes metadata relating to the file including, for example:
- File name;
- Icon;
- File path on remote server;
- Modification date;
- Connection parameters (e.g. connection server identity/address and published application name); and
- Application used to open the file.

The Client Application 320, installed on the Local Client Device 1 910, connects to "Recent Files" Storage 980 on a predetermined basis and receives file information as indicated by Fourth Workflow Element 944. This communication might be implemented different ways, for example push notifications or pull notifications. The predetermined basis may, for example, be according to a predetermined schedule (e.g. every 5 minutes, every 15 minutes, every hour, daily, etc.) or for example according to a predetermined action such as the user logging into the Local Client Device 1 910, establishing a session to a Remote Application 1 990 upon the Remote Server 340, etc. As depicted in FIG. 9 an entry within the "Remote Files" Storage 980 for "File 1" is depicted as File 1 930 and comprises the metadata such as file name, server identity, address, data, icon etc.

Upon receipt of the file information from the Local Client Device 1 910 the Client Application 320 generates a link according to an available CRL schema as denoted by Fifth Workflow Element 945. This link includes all the information necessary to open the same file on the remote host, e.g. Remote Server 340, using either the same application or a default system application associated with the file extension of the file. The accessing of "Recent Files" Storage 980 upon the Storage System/Server 370 may employ the provisioning of credentials from the Local Client Device 1 910 to the Storage System/Server 370 and authentication of the user's credentials upon the Storage System/Server 370.

In a similar manner Client Application 325 upon Local Client Device 2 920 connects to the "Recent Files" Storage 980 upon the Storage System/Server 370 according to a predetermined basis. This may, for example, be according to a predetermined schedule (e.g. every 5 minutes, every 15 minutes, every hour, daily, etc.) or for example according to a predetermined action such as the user logging into the Local Client Device 2 920, establishing a session to a Remote Application 1 990 upon the Remote Server 340, etc. This being depicted as Sixth Workflow Element 946 and subsequent response indicated by Seventh Workflow Element 947 wherein the Storage System/Server 370 transmits the file information to the Client Application 325 upon the Local Client Device 2 920. As discussed above in respect of FIG. 5 the "Recent Files" Storage 980 may contain "Recent Files" information from a plurality of remote servers including, but not limited to, Remote Server 340.

Accordingly, the Client Application 325 on Local Client Device 2 920 generates a special link using an available CRL schema as depicted with Eighth Workflow Element 948 which is stored within Recent Files B 970. This link includes all the information necessary to open the same file on a remote host using either the same application or a default system application associated with the file extension.

Exemplary Process Flows

Within FIGS. 3 to 9 respectively there are depicted and presented embodiments of the invention with respect to direct communication modes and indirect communication modes of synchronizing "Recent Files" upon local client devices and remote servers/storage systems. Accordingly, these direct communication modes and indirect communication modes may be represented as processes. Exemplary processes according to embodiments of the invention being described and depicted in respect of FIGS. 10 to 14.

Figure 10:
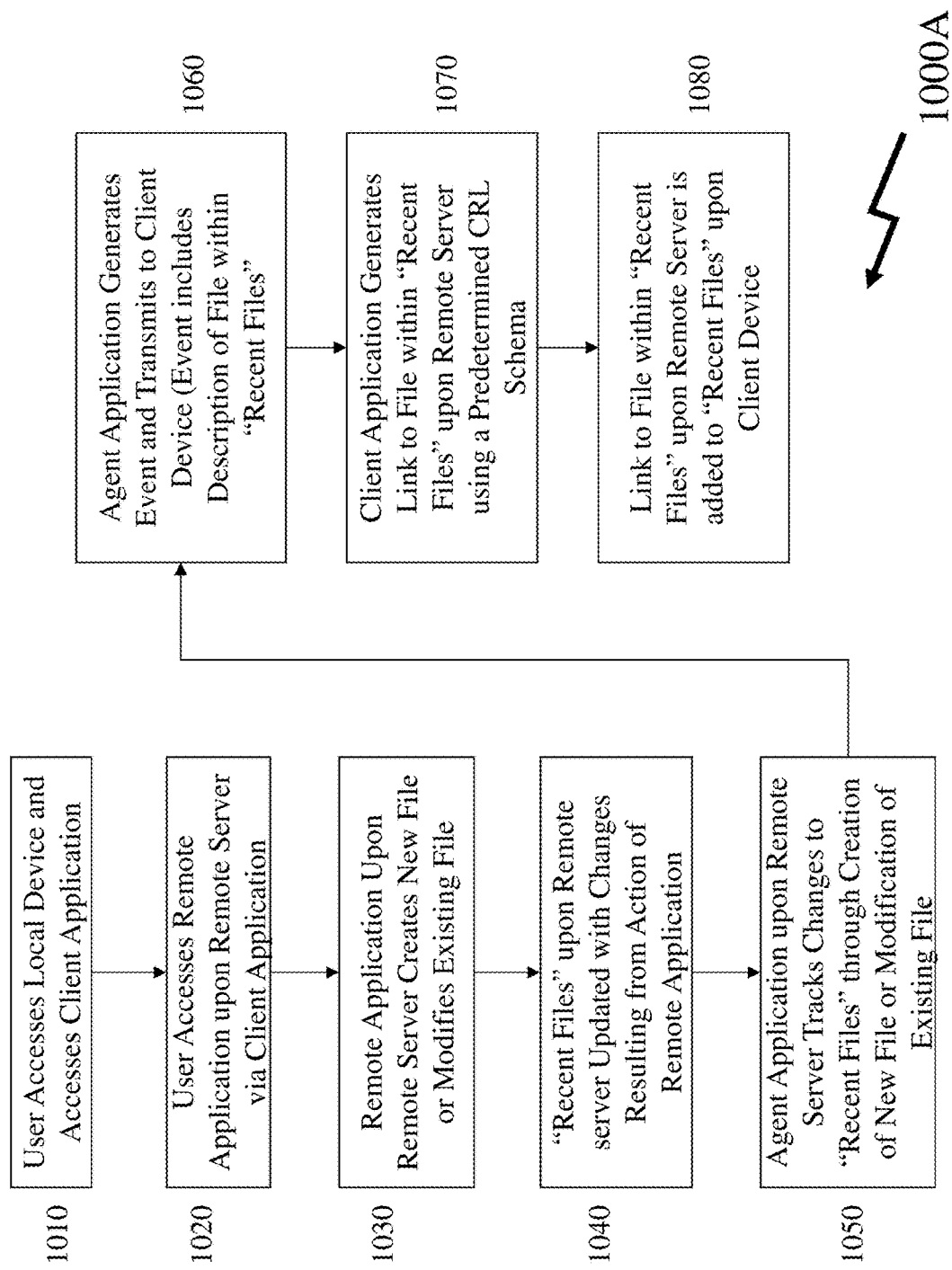
FIG. 10 depicts an exemplary process flow for recent file integration/synchronization according to an embodiment of the invention.

Referring to FIG. 10 there is depicted an exemplary process flow 1000 for recent file integration/synchronization according to an embodiment of the invention. As depicted the process flow 1000 comprises first to eighth steps 1010 to 1080 respectively. These steps being:
- First step 1010, wherein a user accesses a local client device which also results in their accessing a client application upon the local client device;
- Second step 1020 wherein the user accesses a remote application upon a remote server via the client application on the local client device;
- Third step 1030 wherein the remote application upon the remote server creates a new file, modifies an existing file, or performs an operation that results in modification to the data associated with a file;
- Fourth step 1040 wherein the action performed by the remote application results in a change to the "Recent Files" listing on the remote server;
- Fifth step 1050 wherein an agent application upon the remote server, which tracks changes to the "Recent Files" listing upon the remote server, detects a change;
- Sixth step 1060 wherein having detected a change to the "Recent Files" listing on the remote server the agent application generates an event and transmits the event to the local client device, where the event includes a description of the file within the "Recent Files" which comprise one or more elements including, but not limited, a file name of the file, an icon, a file path on the remote server for the file, a modification date, connection parameters (e.g. connection server identity/address and published application name), and an identity of application used to open the file;
- Seventh step 1070 wherein a client application in execution upon the local client device receives the event from the remote server and generates a link to the file using a predetermined CRL schema; and
- Eighth step 1080 wherein the generated link is stored within the "Recent Files" listing upon the local client device.

Figure 11:
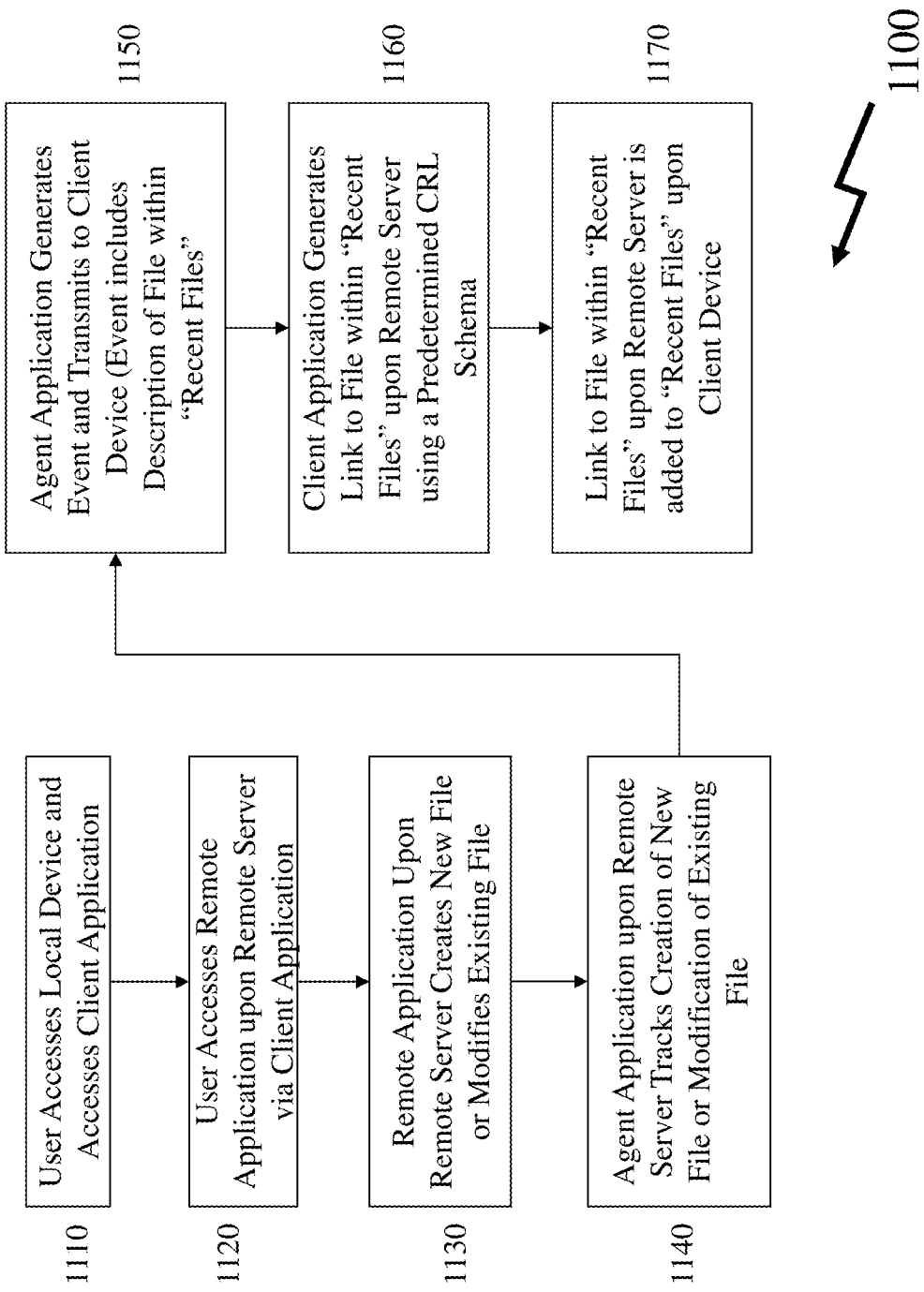
FIG. 11 depicts an exemplary process flow for recent file integration/synchronization according to an embodiment of the invention.

Now referring to FIG. 11 there is depicted an exemplary process flow 1100 for recent file integration/synchronization according to an embodiment of the invention. As depicted the process flow 1100 comprises first to seventh steps 1110 to 1170 respectively. Whilst within process flow 1000 in FIG. 10 an operating system performs establishment and tracking of the recent files listing process flow 1100 employs only an agent application upon the remote server to perform the monitoring of the activities upon the remote server. These steps being:
- First step 1110, wherein a user accesses a local client device which also results in their accessing a client application upon the local client device;
- Second step 1120 wherein the user accesses a remote application upon a remote server via the client application on the local client device;
- Third step 1130 wherein the remote application upon the remote server creates a new file, modifies an existing file, or performs an operation that results in modification to the data associated with a file;
- Fourth step 1140 wherein an agent application upon the remote server tracks the change to the "Recent Files" listing upon the remote server;
- Fifth step 1150 generates an event and transmits the event to the local client device, where the event includes a description of the file created or modified and comprises one or more elements including, but not limited, a file name of the file, an icon, a file path on the remote server for the file, a modification date, connection parameters (e.g. connection server identity/address and published application name), and an identity of application used to open the file;

Sixth step 1160 wherein the client application (or another client application) in execution upon the local client device receives the event from the remote server and generates a link to the file using a predetermined CRL schema; and Seventh step 1170 wherein the generated link is stored within the "Recent Files" listing upon the local client device.

Figure 12:
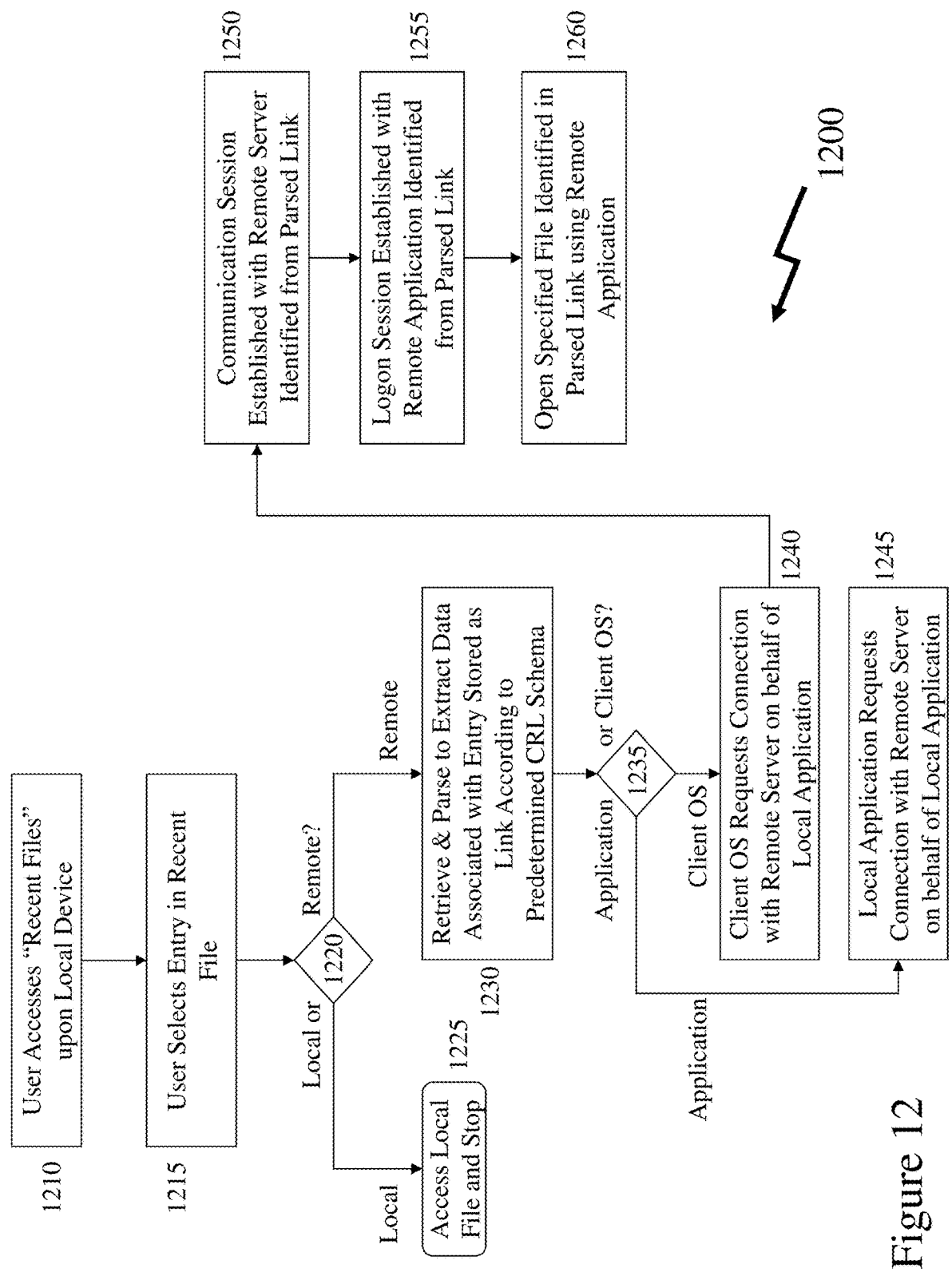
FIG. 12 depicts an exemplary process flow for accessing a file upon a remote system from a link stored within a recent file listing of a local device according to an embodiment of the invention.

Referring to FIG. 12 there is depicted an exemplary process flow 1200 for accessing a file upon a remote system from a link stored within a recent file listing of a local client device according to an embodiment of the invention. As depicted process flow 1200 comprises first to eleventh steps 1210 to 1260 respectively. These being:

First step 1210 wherein a user accesses the recent files listing upon a local device they are employing;

Second step 1215 wherein the user selects an entry within the displayed recent files listing within a software application;

Third step 1220 wherein a determination is made by the software application as to whether the selected recent file is a locally stored file or a remotely stored file wherein if the file is local the process flow 1200 proceeds to step 1225 otherwise it proceeds to step 1230;

Fourth step 1225 wherein the local file is accessed, and the process stops;

Fifth step 1230 wherein a link associated with the selection within the displayed recent files listing is retrieved and parsed to extract data associated with the entry within the link, the data being stored according to a predetermined CRL schema;

Sixth step 1235 wherein a portion of the parsed and extracted data is employed to determine whether the requested file should be accessed by a local application wherein the process proceeds to step 1245 or the client devices operating system wherein the process proceeds to step 1240;

Seventh step 1240 wherein the local client device operating system requests connection with the remote server on behalf of the local application and proceeds to step 1250, the remote server being identified within the parsed and extracted data from the link;

Eighth step 1245 wherein the local application requests connection with the remote server and proceeds to step 1250, the remote server being identified within the parsed and extracted data from the link;

Ninth step 1250 wherein a communication session is established with the remote server;

Tenth step 1255 wherein a logon session is established with a remote application upon the remote server, the identity of the remote application being established from the parsed and extracted data from the link; and Eleventh step 1260 wherein the specified file identified within the parsed and extracted data is opened by the remote application upon the remote server.

Figure 13:
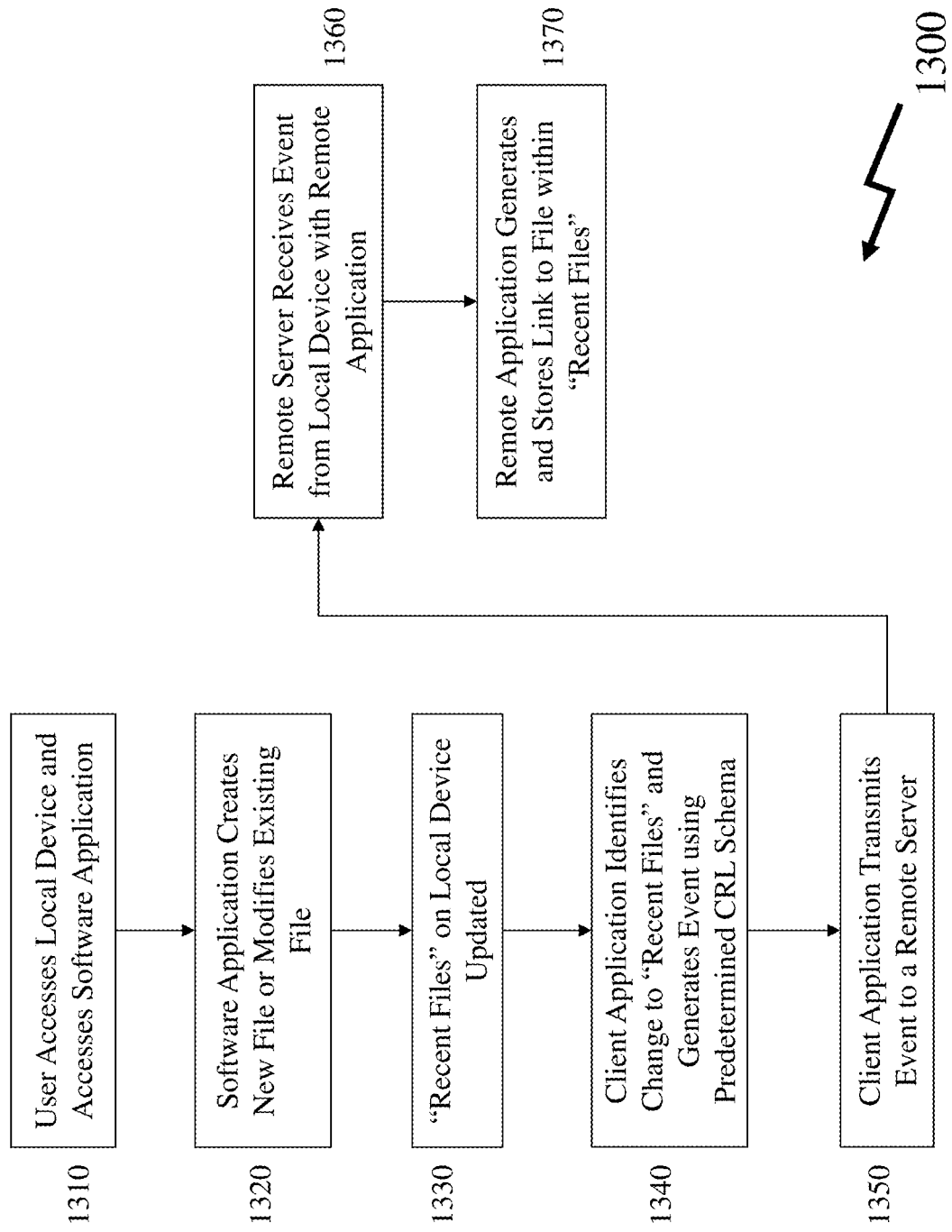
FIG. 13 depicts an exemplary process flow for recent file integration/synchronization of files stored upon a local device with a remote system according to an embodiment of the invention.

FIG. 13 depicts an exemplary process flow 1300 for recent file integration/synchronization of files stored upon a local device with a remote system according to an embodiment of the invention. As depicted process flow 1300 comprises first to seventh steps 1310 to 1370 respectively. These being:

First step 1310 wherein a user accesses a local device initially and then accesses a software application;

Second step 1320 wherein the software application creates a new file, modifies an existing file, or performs an operation that results in modification to the data associated with a file;

Third step 1330 wherein the "Recent Files" upon the local device are updated;

Fourth step 1340 wherein the client application identifies that a change to an entry within the "Recent Files" listing has occurred and generates an event using a predetermined CRL schema;

Fifth step 1350 wherein the client application transmits the event to a remote server;

Sixth step 1360 wherein the remote server receives the event from the local device; and Seventh step 1370 wherein the remote application generates and stores a link within its "Recent Files."

Figure 14:
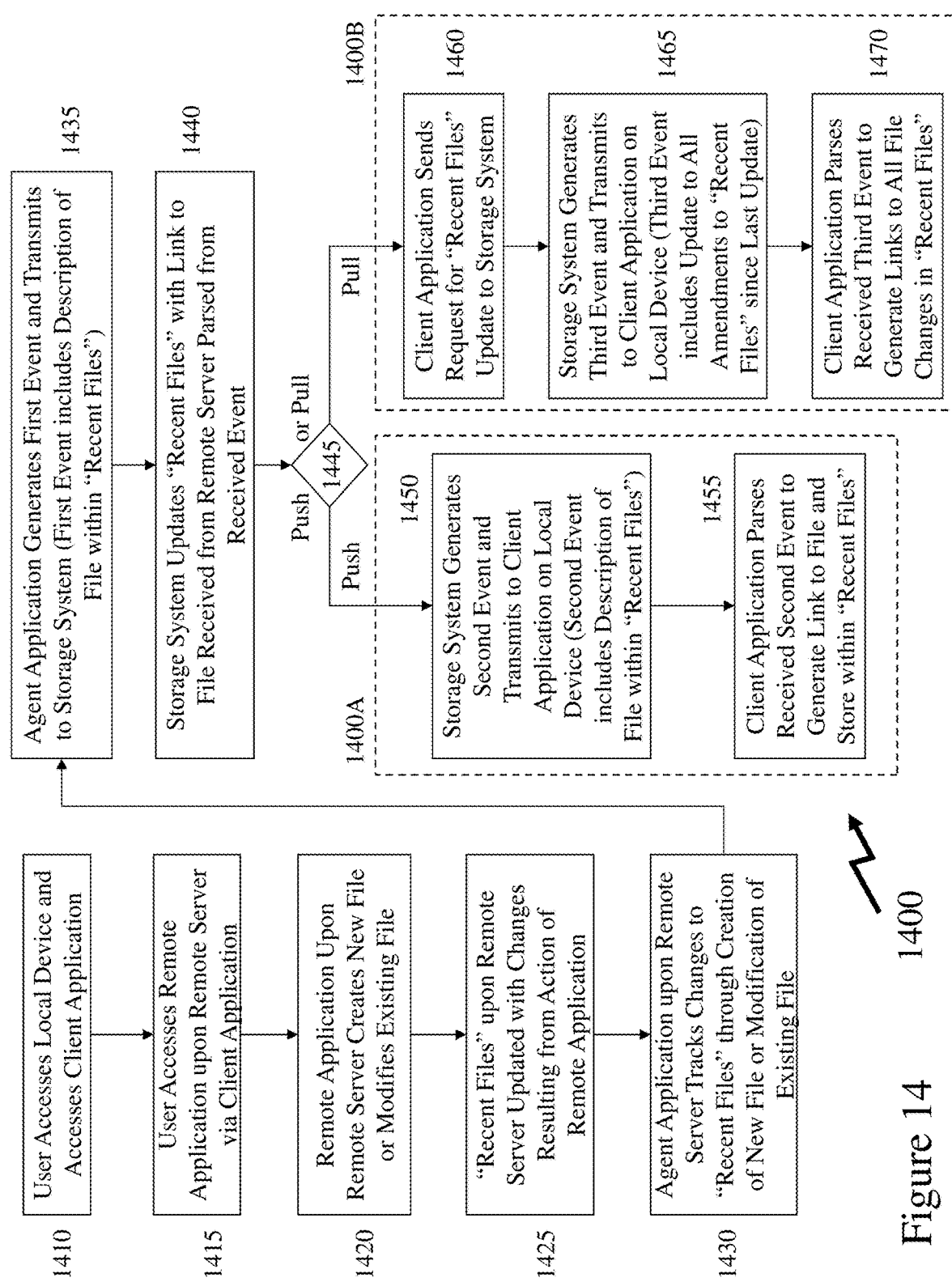
FIG. 14 depicts an exemplary process flow for recent file integration/synchronization via a storage system connected to a local client device and a remote server according to an embodiment of the invention.

FIG. 14 depicts an exemplary process flow 1400 for recent file integration/synchronization via a storage system connected to a local client device and a remote server according to an embodiment of the invention. As depicted process flow 1400 comprises first to thirteenth steps 1410 to 1470 respectively. First to seventh steps 1410 to 1440 comprising:

First step 1410, wherein a user accesses a local client device and a client application upon the local client device;

Second step 1415 wherein the user accesses a remote application upon a remote server via the client application on the local client device;

Third step 1420 wherein the remote application upon the remote server creates a new file, modifies an existing file, or performs an operation that results in modification to the data associated with a file;

Fourth file 1425 wherein the "Recent Files" upon the remote server is updated with changes resulting from the action of the remote application;

Fifth step 1430 wherein an agent application upon the remote server which tracks changes to "Recent Files" through the creation of a new file, modification of an existing file, or performance of an operation resulting in a modification to the data associated with a file establishes that a change has occurred;

Sixth step 1435 wherein the agent application generates a first event and transmits this to a storage system, the first event including a description of the file within the "Recent Files" and comprising elements including, but not limited to, a description of the file created or modified and comprises one or more elements including, but not limited, a file name of the file, an icon, a file path on the remote server for the file, a modification date, connection parameters (e.g. connection server identity/address and published application name), and an identity of application used to open the file; and Seventh step 1440 wherein the storage system updates "Recent Files" with a link to the file based upon parsing the first event received from the remote server.

In eighth step 1445 the process proceeds to one of two different sub-processes, either first sub-process 1400A or second sub-process 1400B, in dependence upon whether the updating process from the storage system to the local client device is a push type update or a pull type update. This being a configuration setting of the system which may be established, for example, by the user, an enterprise or organization associated with the client device, an enterprise or organization associated with the remote server, an enterprise or organization associated with the storage system, and an enterprise or organization associated with the software managing the process.

First sub-process 1400A comprises ninth and tenth steps 1450 and 1455 respectively. These being:

- Ninth step 1450 wherein the storage system generates a second event and transmits this to the client application upon the local device, where the second event includes a description of the file and comprises one or more elements including, but not limited, a file name of the file, an icon, a file path on the remote server for the file, a modification date, connection parameters (e.g. connection server identity/address and published application name), and an identity of application used to open the file; and
- Tenth step 1455 wherein the client application parses the received second event to generate a link to the file and stores this within the "Recent Files" of the local device.

Second sub-process 1400B comprises eleventh to thirteenth steps 1460 and 1470 respectively. These being:

- Eleventh step 1460 wherein the client application sends a request for a "Recent Files" update to the storage system;
- Twelfth step 1465 generates a third event and transmits this to the client application on the local device, where the third event includes information relating to those files which have been updated since the last update where the information for each file may include, but not be limited to, a description of the file and comprises one or more elements including, but not limited, a file name of the file, an icon, a file path on the remote server for the file, a modification date, connection parameters (e.g. connection server identity/address and published application name), and an identity of application used to open the file; and
- Thirteenth step 1470 wherein the client application parses the received third event to generate a link for each file for which information is included within the third event and stores this within its "Recent Files."

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
executing a registry application upon a first electronic device comprising at least a microprocessor;
storing solely within a first memory accessible to the first microprocessor a first electronic registry comprising a centralized listing of a plurality of files;
establishing within an executing application upon the first electronic device user selection of a file of the plurality of files,
determining whether the selected file of the plurality of files is associated with a first event or a second event:
upon determining that the selected file of the plurality of files is associated with a first event the executing application within which the user makes the selection accesses a remote file stored upon a second memory associated with the selected file of the plurality of files in dependence upon first metadata stored in association with the first event; and
upon determining that the selected file of the plurality of files is associated with a second event the executing application within which the user makes the selection accesses the local file stored upon a third memory associated with the selected file of the plurality of files in dependence upon second metadata stored in association with the second event; wherein
all applications when executing upon the first electronic device can access and render the centralized listing of plurality of files such that the user of the first electronic device can select the file of the plurality of files within any executing application;
the first electronic registry comprises:
a first portion relating to remote files established in dependence upon first events received from one or more second electronic devices for which associated first metadata is stored within the first electronic registry, each first event relating to a remote file stored upon the second memory accessible to a second electronic device of the one or more second electronic devices;
a second portion relating to local files established in dependence upon second events associated with the first electronic device for which associated second metadata is stored within the first electronic registry, each second event relating to a local file stored upon the third memory accessible to the first electronic device; wherein
the first electronic registry is hosted solely within the first memory and provides the user with access to the centralized listing of the plurality of files where each file of the plurality of files is associated with a first event or a second event a rising from an action established upon the first electronic device;
the action is established by one of:
another action within a software application executing upon the first electronic device performed by a user of the first electronic device,
a further action performed by the user within another software application launched upon the second electronic device of the one or more second electronic devices in dependence upon the user executing a further application upon the first electronic device;
an automatic action performed by the software application executing upon the first electronic device after the user has accessed the software application; and
a further automatic action performed by the another software application after the another application has been launched upon the second electronic device of the one or more second electronic devices;
the centralized listing stores each file of the plurality of files independent of any application associated with the action resulting in the one of the first event or the second event associated with the file of the plurality of files;

each first event relating to a remote file of the plurality of remote files is one of creating the remote file, opening the remote file, modifying the remote file, saving the remote file and copying-pasting content data upon the one or more second electronic devices; and each second event relating to a local file of the plurality of local files is one of creating the local file, opening the local file, modifying the local file, saving the local file and copying-pasting content data upon the first electronic device.

2. The method according to claim 1, wherein the centralized listing of the plurality of files when rendered upon the first electronic device to a user are rendered in a chronological order independent of whether each file in the plurality of files is associated with a first event associated with a remote file or a second event associated with a local file.

3. The method according to claim 1, wherein each first event is established in dependence upon data received from a second electronic device of the one or more second electronic devices; and the data is generated by the second electronic device of the one or more second electronic devices with a process comprising:
determining with a second microprocessor forming part of the second electronic device whether a third event has occurred relating to a remote file stored within the second memory accessible by the second microprocessor, upon a positive determination generating with the second microprocessor a file entry within a second file registry, the second file registry stored within the second memory accessible by the second microprocessor;
generating with the second microprocessor third metadata relating to the third event; and
transmitting an indication of the third event and the third metadata to the first electronic device.

4. The method according to claim 1, wherein the first metadata stored within the first electronic registry for each first event is generated by a process comprising: receiving the first event upon the first electronic device from the second electronic device of the one or more second electronic devices;
generating with the first microprocessor a link to the remote file associated with the first event in dependence upon a first predetermined portion of third metadata received from the second electronic device of the one or more second electronic devices with the first event; and
storing with the first microprocessor the link within the first file registry as a predetermined portion of the first metadata; and
accessing the remote file stored upon the second memory associated with the selected file of the plurality of files in dependence upon the first metadata stored in association with the first event Comprises:
retrieving the link; and
activating the fink wherein a remote access application upon the first electronic device executes a process comprising the steps of:
establishing a connection with a remote server, execute a logon session to establish a remote session upon the remote server, and opening the remote file associated with the first event stored upon the second memory using a remote application specified within at least one of the first metadata and the link.

5. The method according to claim 1, wherein
the first metadata comprises:
a first predetermined portion established in dependence upon third metadata forming part of the first event received from the second electronic device of the one or more second electronic devices and comprising at least one of an identity of the file, time data relating to the storage of the file, and a location of the file within the first memory;
a second predetermined portion established in dependence upon fourth metadata within the first event received from the second electronic device of the one or more second electronic devices and comprising at least one of an icon to render in association with the link within a graphical user interface, an identity or address of the remote server, a first identity relating to a published software application name associated with the storage of the file, and a second identity relating to a software application to be employed in accessing the file.

6. The method according to claim 1, wherein
selection of 4 first predetermined portion of the first metadata rendered upon the first electronic device within the centralized listing of all files accessed by the first electronic device triggers a process to access the remote file stored within the second memory accessible to the second electronic device of the one or more second electronic devices associated the selected first predetermined portion of the first metadata relates; and
the process to access the remote file comprises:
retrieving a second predetermined portion of the first metadata to which the selected first predetermined portion of the first metadata relates;
parsing the second predetermined portion of the first metadata to extract third metadata;
establishing a connection to the second electronic device of the one or more second electronic devices identified within a first portion of the extracted third metadata;
establishing a session with a remote application in execution upon the second electronic device of the one or more second electronic devices, the session established in dependence upon a second portion of the extracted third metadata; and opening the file within the remote application, the file being identified to the remote application in dependence upon a third portion of the extracted second metadata.

7. The method according to claim 1, further comprising transmitting at least one of the first portion and the second portion of the first electronic registry to a third electronic device, wherein a determination to transmit to the third electronic device is made in dependence upon either a criterion associated with the first electronic registry being met or a request being received from the third electronic device; and another user upon the third electronic device can access at least one of a remote file associated with a first event stored upon the second electronic device of the one or more second electronic devices and a local file associated with a second event stored upon the first electronic device.

8. The method according to claim 1, wherein the first electronic device is one of a plurality of first electronic devices: each first electronic device maintains a first electronic registry; each first portion of the first electronic registry of each client device of the plurality of first electronic devices is the same; and each second portion of the first electronic registry of each client device of the plurality of first electronic devices is the specific to that first electronic device of the plurality of first electronic devices.

9. The method according to claim 1, wherein the remote server is one of a plurality of remote servers accessed within a series of remote sessions by first electronic devices;
the second portion of the first electronic registry comprises a sub-portion associated with each remote session of the series of remote sessions; and
the centralized listing when rendered to the user provides a single view of all remote files associated with the series of remote sessions upon the plurality of remote servers associated with a further action performed by the user and @ further automatic action performed by another software application in execution within one of the series of remote Sessions.

10. The method according to claim 1, wherein the user is one user of a plurality of users accessing the first electronic device;
the first metadata includes data relating to an identity of the user accessing the first electronic device when the one of the further action and further automatic action are performed;
the second metadata includes data relating to the identity of the user accessing the first electronic device when the one of the another action and the automatic action are performed; and
the centralized listing of the plurality of files when rendered to another user is filtered in dependence upon another identity of the another user accessing the first electronic device.

11. The method according to claim 1, wherein
the remote server is one of a plurality of remote servers accessed within a series of remote sessions by first electronic devices;
the user is one user of a plurality of users accessing the first electronic device;
the first metadata includes: user data relating to an identity of the user accessing the first electronic device when the
one of the further action and further automatic action was performed, session data relating to an identity of a remote session of the plurality of remote sessions when the one of the further action and further automatic action was performed;
the second metadata includes data relating to the identity of the user accessing the first electronic
device when the one of the another action and the automatic action was performed;
the second portion of the first electronic registry comprises a sub-portion associated with each remote session of the series of remote sessions: and a client application in execution upon the first electronic device executes a series of steps comprising: rendering to the user a listing of the series of remote sessions; establishing selection of a remote session from the series of remote sessions rendered, filtering the centralized listing in dependence upon the identity of the user and the identity of the selected remote session of the series of remote sessions; and rendering a portion of the centralized listing to the user; and the portion of the centralized listing provides a single view comprising: all remote files associated with the user of the first electronic device and the selected remote session of the series of remote sessions upon the plurality of remote servers associated with a further action performed by the user and a further automatic action performed by another software application in execution within the selected remote session of the series of remote sessions; and all focal files associated with the user of the first electronic device associated with another action and an automatic action.

12. A system comprising: a local client device comprising a first microprocessor, a first memory storing first computer executable instructions, a first network interface connecting the local client device to a communications network and one or more user interfaces for receiving user inputs, the first computer executable instructions when executed by the first microprocessor configure the local client device to: receive first inputs from the user, the first inputs relating to a request to execute a remote application to access a remote file of a plurality of remote files upon a remote server also connected to the communications network, transmit first data to the remote server to establish a first session upon the remote server providing access to the remote file of the plurality of remote files within the remote application for the user;
receive second inputs from the user, the second inputs relating to a first action relating to a remote file of the plurality of remote files to be performed by the remote application: transmit second data to the remote server to establish the action, receive third data from the remote server, the third data comprising metadata relating to the remote file of the plurality of remote files stored within a second memory as a result of the first action or a second action; generate with a client application a file Content Resource Locator (CRL}, and store an entry comprising at least the file CRL within a first electronic registry; and the remote server comprising a second microprocessor, a third memory storing second computer executable instructions, a second network interface connecting the remote server to the communications network, the second computer executable instructions when executed by the second microprocessor configure the remote server to: receive the first data from the local client device: establish the remote application in execution upon the remote server; establish the first session upon the remote server to provide access to the remote application to the user; open the remote file of the plurality of remote files within the remote application; receive the second data from the local client device: perform the first action relating to the remote file of the plurality of remote files with the remote application: storing the remote file of the plurality of remote files within at least one of the second memory and a storage system accessible to the remote server; generate the third data relating to the storage of the remote file of the plurality of remote files within at least one of the second memory and the storage system accessible to the remote server: and transmit the third data to the local client device for storage within the first electronic registry; wherein the first electronic registry is hosted solely within the first memory and provides the user with access to the centralized listing of the plurality of files where each file of the plurality of files is associated with a first action, a second action, or a third action arising from an event established upon the first electronic device by the user;
the first electronic registry comprises:
a first portion relating to a plurality of remote files, each remote file of the plurality of remote files associated with at least one of an executed first action and an executed second action, and a second portion relating to a plurality of local files, each local file of the plurality of local files associated with an executed third action and stored within the first electronic registry:

each first action is a user triggered action within the remote application launched upon the remote server performed by the user with respect to the remote file of the plurality of remote files:

each second action is an automatic action within the remote application launched upon the remote server performed by the remote application after the user has accessed the remote application to work on the remote file of the plurality of remote files;

each third action is at least one of:

a further user triggered action within a software application executing upon the first electronic device triggered by the user of the first electronic device with respect to the local file of the plurality of local files; and a further automatic action performed by the software application executing upon the first electronic device after the user has accessed the software application to work on the local file of the plurality of local files;

each first action or second action relating to a remote file of the plurality of remote files is one of creating the remote file, opening the remote file, modifying the remote file, saving the remote file and copying-pasting content data upon the one or more second electronic devices; and each second event relating to a focal file is one of creating the local file, opening the local file, modifying the local file, saving the local file and copying-pasting content data upon the first electronic device.

13. The system according to claim 11, further comprising the first computer executable instructions further configure the local client device to transmit at least one of the first portion of the first electronic registry and the second portion of the first electronic registry to a third electronic device, wherein a determination to transmit to the third electronic device is made in dependence upon either a criterion associated with the first electronic registry being met or a request being received from the third electronic device;

another user upon the third electronic device can access a remote file of the plurality of remote files associated with the first portion of the first electronic registry directly from the remote server within another remote session established between the third electronic device and the remote server based upon first metadata associated with the entry of the associated remote file of the plurality of remote files within the first portion of the first electronic registry; and the another user upon the third electronic device can access a local file of the plurality of local files associated with the second portion of the first electronic registry directly from the first electronic device within a further remote session established between the third electronic device and the first electronic device based upon second metadata associated with the entry of the associated local file of the plurality of local files within the second portion of the second electronic registry.

14. The system according to claim 11, wherein each entry within the first portion of first electronic registry comprises:

a first predetermined portion established in dependence upon the third metadata and comprises an identity of the file, time data relating to the storage of the file, and a location of the file within the within at least one of the second memory and the storage system, a second predetermined portion established in dependence upon fourth metadata received from the remote server associated with at least one of the first action and the second action comprises an icon to render in association with the fink within a graphical user interface, an identity or address of the remote server, a first identity relating to a published software application name associated with the storage of the remote file of the plurality of files, and a second identity relating to a software application to be employed in accessing the remote file of the plurality of remote files.

15. The system according to claim 11, wherein the first computer executable instructions further configure the local client device to: establish that a third action has occurred: generate fourth data, the fourth data comprising further metadata relating to the local file of the plurality of local files associated with the third action: transmit the fourth data to the remote server; the second computer executable instructions further configure the remote server to: store the third data within another first portion of a second electronic file registry; receive the fourth data from the first electronic device; store the fourth data within another second portion of the second electronic file registry; the second electronic registry is hosted solely within the one of the second memory and the storage system and provides the user with access to the centralized listing of the plurality of files where each file of the plurality of files is associated with a first action, a second action, or a third action arising from an event established upon the first electronic device by the user; the second electronic registry comprises: the another first portion relating to the plurality of remote files, each remote file of the plurality of remote files associated with at least one of the executed first action and the executed second action: and the another second portion relating to the plurality of local files, each local file of the plurality of local files associated with an executed third action; and the second electronic registry allows another user to access at least one of a local file of the plurality of local files and a remote file of the plurality of remote files from a third electronic device via another remote session associated with at least one of the remote server and the local client device.

16. The system according to claim 11, wherein the first computer executable instructions further configure the local client device to: establish that a third action has occurred:

generate fourth data, the fourth data comprising further metadata relating to the local file of the plurality of local files associated with the third action;

transmit the fourth data to the remote server;

the second computer executable instructions further configure the remote server to: store the third data within another first portion of a second electronic file registry;

receive the fourth data from the first electronic device;

store the fourth data within another second portion of the second electronic file registry;

the second electronic registry is hosted solely within the one of the second memory and the storage system and provides the user with access to the centralized listing of the plurality of files where each file of the plurality of files is associated with a first action, a second action, or a third action arising from an event established upon the first electronic device by the user, the second electronic registry comprises:

the another first portion relating to the plurality of remote files, each remote file of the plurality of remote files associated with at least one of the executed first action and the executed second action: and the another second portion relating to the plurality of local files, each local file of the plurality of local files associated with an executed third action; and the first electronic registry and the second electronic registry are synchronized.

17. The system according to claim 11, wherein the local client device is one of a plurality of local client devices; and each local client device maintains a first electronic registry;
- each first portion of the first electronic registry of each client device of the plurality of local client devices is the same;
- each second portion of the first electronic registry of each client device of the plurality of local client devices is the specific to that local client device of the plurality of local client devices.

18. The system according to claim 11, wherein
- the remote server is one of a plurality of remote servers accessed within a series of remote sessions by local client devices; and
- the second portion of the first electronic registry comprises a sub-portion associated with each remote session of the series of remote sessions; and
- the centralized listing when rendered to the user provides a single view of all remote files associated with the series of remote sessions upon the plurality of remote servers associated with a further action performed by the user and a further automatic action performed by another software application in execution within one of the series of remote Sessions.

19. The system according to claim 11, wherein
the user is one user of a plurality of users accessing the local client device;
the first metadata includes data relating to an identity of the user accessing the local client device when the one of the further action and further automatic action are performed,
the second metadata includes data relating to the identity of the user accessing the focal client device when the one of the another action and the automatic action are performed; and
the centralized listing of the plurality of files when rendered to another user is filtered in dependence upon another identity of the another user accessing the local client device.

20. The system according to claim 11, wherein the remote server is one of a plurality of remote servers accessed within a series of remote sessions by local client devices; the user is one user of a plurality of users accessing the local client device; the first metadata includes: user data relating to an identity of the user accessing the local client device when the one of the first action and second action was performed: session data relating to an identity of a remote session of the plurality of remote sessions when the one of the first action and the second action was performed, the second metadata includes data relating to the identity of the user accessing the local client device when the third action was performed, the second portion of the first electronic registry comprises a sub-portion associated with each remote session of the series of remote sessions; and a client application in execution upon the local client device executes a series of steps comprising: rendering to the user a listing of the series of remote sessions; establishing selection of a remote session from the series of remote sessions rendered, filtering the centralized listing in dependence upon the identity of the user and the identity of the selected remote session of the series of remote sessions; and rendering a portion of the centralized listing to the user, and the portion of the centralized listing provides a single view comprising: all remote files associated with the user of the local client device and the selected remote session of the series of remote sessions upon the plurality of remote servers associated with a first action performed by the user and a second action performed by another software application in execution within the selected remote session of the series of remote sessions; and all local files associated with the user of the local client device associated with a third action performed by the user.

21. The method according to claim 1, wherein the first metadata comprises a fink established according to a predetermined Content Resource Locator (CRL) schema generated in dependence upon third metadata forming part of the first event, and the link is generated either upon the first electronic device or generated upon and received from the second electronic device of the one or more second electronic devices; and
- the link when activated with a client application on the local client device executes a process to establish a connection with a remote server, execute a logon session to establish a remote session upon the remote server, and open the file; and
- the remote server opens the file using a remote application specified within the link.

* * * * *